US011652788B2

(12) United States Patent
Nishizaki

(10) Patent No.: US 11,652,788 B2
(45) Date of Patent: May 16, 2023

(54) COMMUNICATION SYSTEM INCLUDING FIRST MEDIATION APPARATUS AND SECOND MEDIATION APPARATUS FOR TRANSMITTING COMMAND RECEIVED FROM MANAGEMENT SERVER

(71) Applicant: BROTHER KOGYO KABUSHIKI KAISHA, Aichi (JP)

(72) Inventor: Takashi Nishizaki, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 929 days.

(21) Appl. No.: 16/361,795

(22) Filed: Mar. 22, 2019

(65) Prior Publication Data

US 2019/0306115 A1   Oct. 3, 2019

(30) Foreign Application Priority Data

Mar. 30, 2018   (JP) .............................. JP2018-068991

(51) Int. Cl.
*H04L 9/40* (2022.01)
*G06F 16/22* (2019.01)
(Continued)

(52) U.S. Cl.
CPC ............ *H04L 63/02* (2013.01); *G06F 3/1203* (2013.01); *G06F 3/1231* (2013.01);
(Continued)

(58) Field of Classification Search
CPC ... H04L 63/02; H04L 61/2589; H04L 63/029; H04L 67/2819; H04L 61/103;
(Continued)

(56) References Cited

U.S. PATENT DOCUMENTS 9,769,139 B2   9/2017 Chizhov et al.
2015/0153980 A1*  6/2015 Ito ....................... H04L 63/0281
                                                          358/1.14
(Continued)

FOREIGN PATENT DOCUMENTS

JP   2017-536598 A   12/2017

OTHER PUBLICATIONS

Extended European Search Report dated Aug. 14, 2019 in European Patent Application No. 19 16 5005.0.

*Primary Examiner* — Fatoumata Traore
*Assistant Examiner* — Carlton Johnson
(74) *Attorney, Agent, or Firm* — Scully, Scott, Murphy & Presser, P.C.

(57) ABSTRACT

In a communication system, a first mediation apparatus includes a first control device. The first control device stores in a memory a correlation database correlating a mediation apparatus ID of the second mediation apparatus with a first device ID of a device. The first controller requests a management server to register the first device ID, and receives a first command from the management server. The first controller transmits a second command to the second mediation apparatus through the firewall by using a series of procedures. The second command includes second instruction information based on the second command. The first controller transmits a first response to the management server. The second mediation apparatus includes a second control device to initiate the series of procedures and transmits a third command based on the second command to the device, and transmits a second response as to the first mediation apparatus through the firewall.

30 Claims, 9 Drawing Sheets

(51) Int. Cl.
  *G06F 3/12*     (2006.01)
  *H04L 61/2589*  (2022.01)
  *H04L 67/564*   (2022.01)
  *H04L 61/103*   (2022.01)
  *H04L 67/02*    (2022.01)

(52) U.S. Cl.
  CPC .......... *G06F 3/1236* (2013.01); *G06F 3/1288* (2013.01); *G06F 16/22* (2019.01); *H04L 61/2589* (2013.01); *H04L 63/029* (2013.01); *H04L 67/564* (2022.05); *G06F 3/1285* (2013.01); *G06F 3/1287* (2013.01); *H04L 61/103* (2013.01); *H04L 67/02* (2013.01)

(58) Field of Classification Search
  CPC ..... H04L 67/02; G06F 3/1203; G06F 3/1231; G06F 3/1236; G06F 3/1288; G06F 16/22; G06F 3/1285; G06F 3/1287
  See application file for complete search history.

(56) References Cited

U.S. PATENT DOCUMENTS

| | | |
|---|---|---|
| 2015/0242177 A1 | 8/2015 | Nakahara |
| 2016/0085533 A1 | 3/2016 | Jayanti Venkata |
| 2016/0087854 A1 | 3/2016 | Jayanti Venkata |
| 2016/0087955 A1 | 3/2016 | Mohamad Abdul et al. |
| 2016/0087956 A1 | 3/2016 | Maheshwari et al. |
| 2016/0088021 A1 | 3/2016 | Jayanti Venkata |
| 2016/0088026 A1 | 3/2016 | Mohamad Abdul et al. |

\* cited by examiner

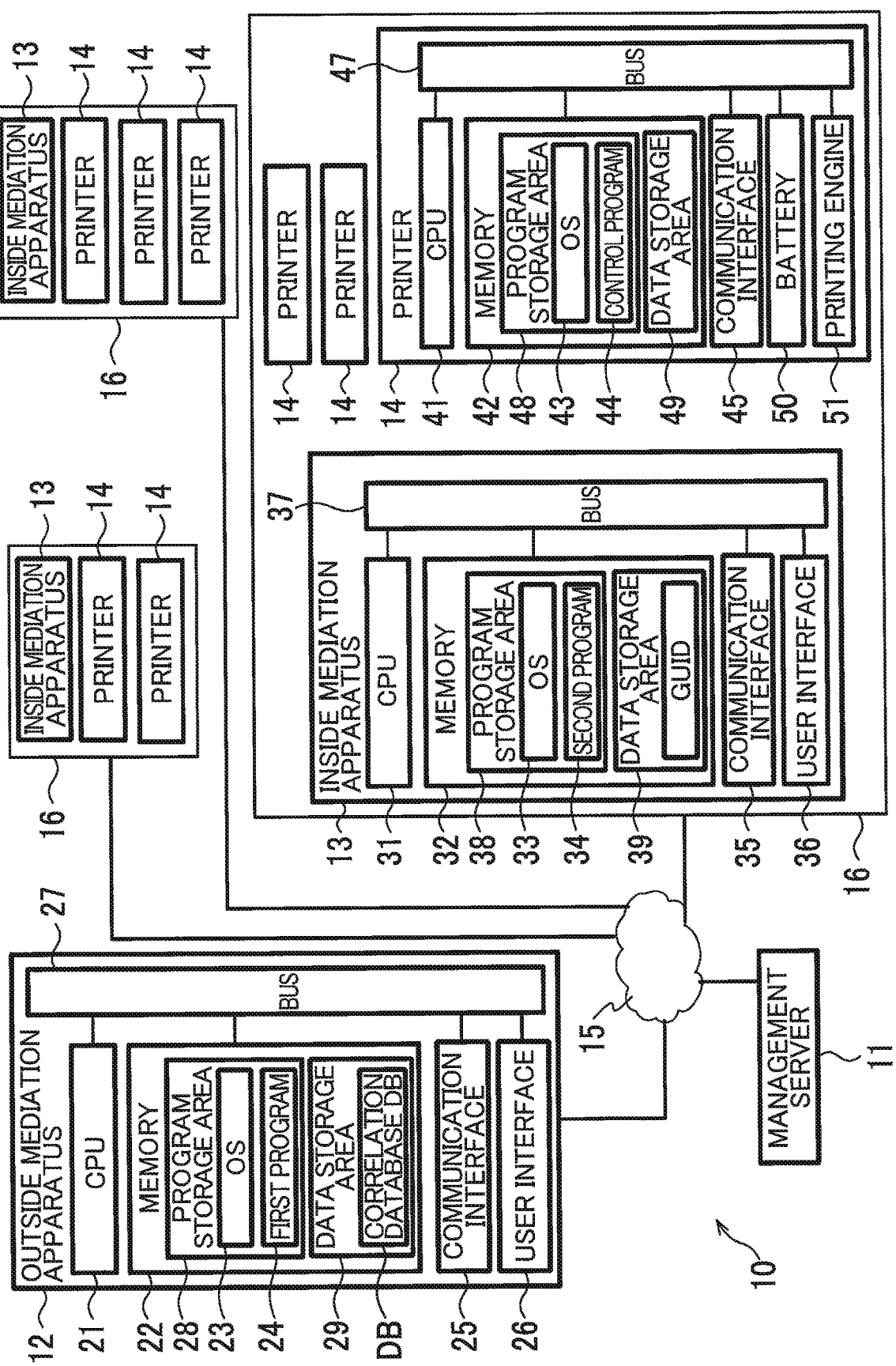

FIG. 2

CORRELATION DATABASE DB

| DEVICE ID | GUID | LOCATION INFO | FIRMWARE VERSION | SETTINGS INFORMATION | | | | MODIFIED DATE | CONDITION INFO |
|---|---|---|---|---|---|---|---|---|---|
| | | | | FONT | FONT SIZE | DENSITY | ... | | |
| 001 | 00A | BRANCH OFFICE A | 2 | GOTHIC | 14 | 3 | ... | 2018.04.01 | MANAGING |
| 002 | 00A | BRANCH OFFICE A | 3 | GOTHIC | 14 | 3 | ... | 2018.04.03 | MANAGING |
| 003 | 00A | BRANCH OFFICE A | 2 | GOTHIC | 14 | 3 | ... | 2018.04.02 | MANAGING |
| 004 | 00B | BRANCH OFFICE B | 2 | GOTHIC | 12 | 2 | ... | 2018.04.02 | MANAGING |
| 005 | 00B | BRANCH OFFICE B | 2 | GOTHIC | 12 | 2 | ... | 2018.04.3 | MANAGING |
| 006 | 00C | BRANCH OFFICE C | 2 | MINCHO | 12 | 2 | ... | 2018.04.2 | MANAGING |
| 007 | 00C | BRANCH OFFICE C | 1 | MINCHO | 14 | 3 | ... | 2018.04.02 | MANAGING |
| 008 | 00C | BRANCH OFFICE C | 2 | MINCHO | 12 | 2 | ... | 2018.04.02 | MANAGING |
| 009 | 00C | BRANCH OFFICE C | — | — | — | — | ... | — | WAITING |
| ..... | ..... | ..... | ..... | ..... | ..... | ..... | ..... | ..... | ..... |

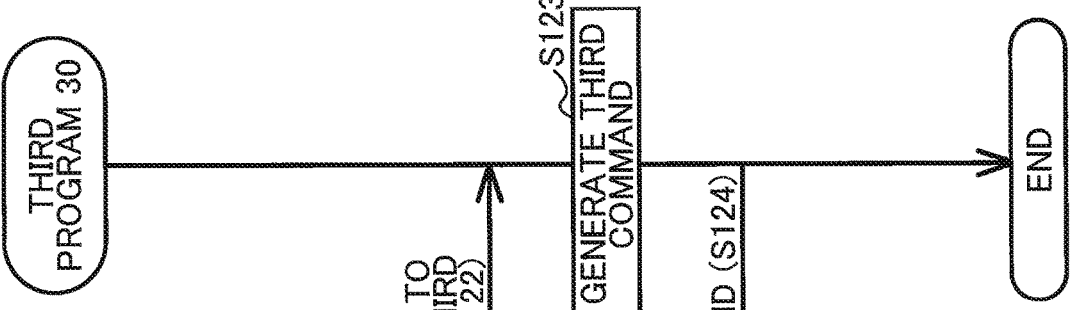
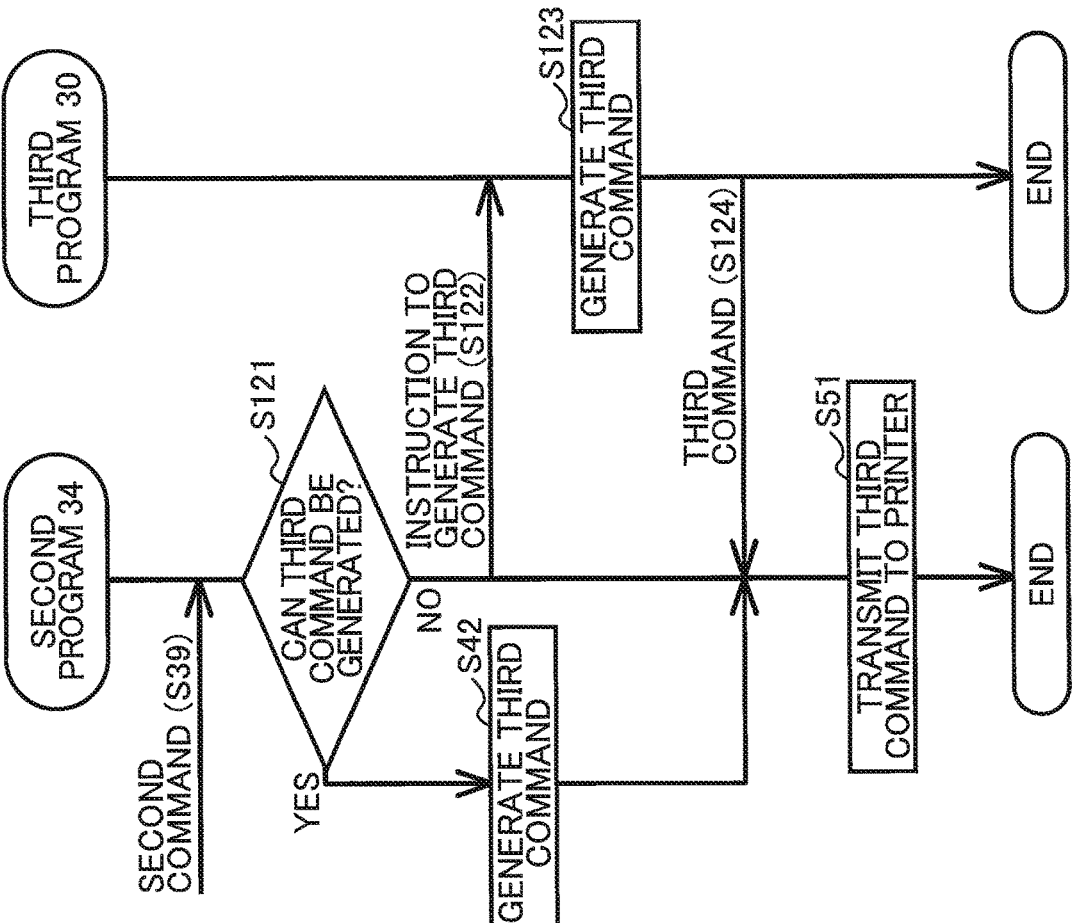
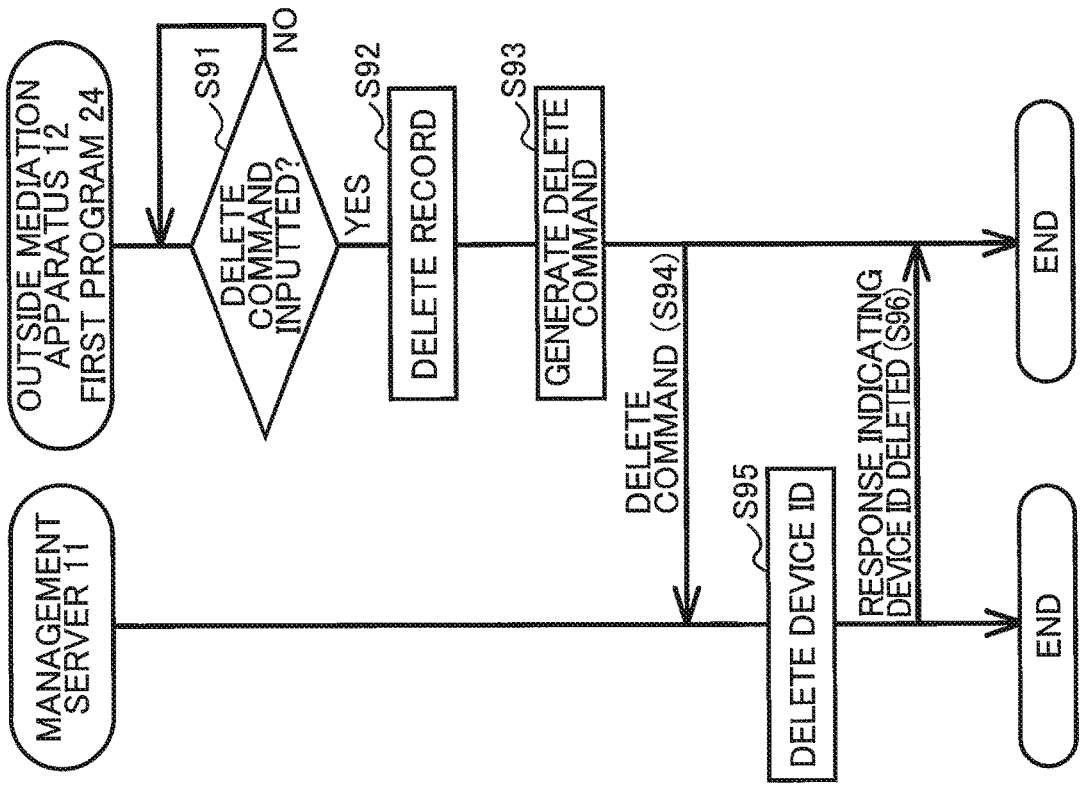

COMMUNICATION SYSTEM INCLUDING FIRST MEDIATION APPARATUS AND SECOND MEDIATION APPARATUS FOR TRANSMITTING COMMAND RECEIVED FROM MANAGEMENT SERVER

CROSS REFERENCE TO RELATED APPLICATION

This application claims priority from Japanese Patent Application No. 2018-068991 filed Mar. 30, 2018. The entire content of the priority application is incorporated herein by reference.

TECHNICAL FIELD

The present disclosure relates to a program and a communication system for managing devices.

BACKGROUND

A conventional mobile device management (abbreviated herein as MDM) system includes a management server on the Internet that communicates with and manages mobile devices. The mobile devices may be mobile phones, tablets, or notebook type personal computers that connect directly to the Internet and are capable of communicating with the management server.

SUMMARY

However, the conventional technology is not sufficiently considered with respect to management by the MDM system to manage devices that do not communicate directly with the management server.

In view of the foregoing it is an object of the present disclosure to provide a method of managing devices that do not communicate directly with a management server using an MDM system.

In order to attain the above and other objects, the disclosure provides a non-transitory computer readable storage medium storing a set of program instructions comprising first program instructions executed by a first mediation apparatus, and second program instructions executed by a second mediation apparatus. The first mediation apparatus includes a memory. The first mediation apparatus is configured to communicate with a management server via an internet and communicate with the second mediation apparatus through firewall. The second mediation apparatus is configured to communicate with a device via a local network. The first program instructions include: storing in the memory a correlation database correlating a mediation apparatus ID for identifying the second mediation apparatus with a first device ID for identifying the device; requesting via the internet the management server to register the first device ID which is correlated to the second mediation apparatus in the correlation database; after the requesting, receiving via the internet a first command from the management server, the first command including a second device ID matching the first device ID and first instruction information for the device identified by the second device ID; specifying the mediation apparatus ID correlated with the second device ID matching the first device ID in the correlation database; transmitting a second command to the second mediation apparatus identified by the specified mediation apparatus ID through the firewall by using a series of procedures which is initiated by the identified second mediation apparatus and enables the second mediation apparatus to receive information from the first mediation apparatus through the firewall, the second command including a third device ID matching the second device ID and second instruction information based on the first instruction information in the second command; and transmitting a first response as a response to the first command to the management server via the internet. The second program instructions include: initiating the series of procedures; receiving the second command through the firewall; transmitting a third command to the device identified by the third device ID, the third command including third instruction information based on the second instruction information; and transmitting a second response as a response to the second command to the first mediation apparatus through the firewall.

According to another aspect, the disclosure provides a communication system including a first mediation apparatus and a second mediation apparatus. The first mediation apparatus is configured to communicate with a management server via an internet and communicate with the second mediation apparatus through firewall, the second mediation apparatus being configured to communicate with a device via a local network. The first mediation apparatus includes a memory and a first control device configured to perform: storing in the memory a correlation database correlating a mediation apparatus ID for identifying the second mediation apparatus with a first device ID for identifying the device; requesting via the internet the management server to register the first device ID which is correlated to the second mediation apparatus in the correlation database; after the requesting, receiving via the internet a first command from the management server, the first command including a second device ID matching the first device ID and first instruction information for the device identified by the second device ID; specifying the mediation apparatus ID correlated with the second device ID matching the first device ID in the correlation database; transmitting a second command to the second mediation apparatus identified by the specified mediation apparatus ID through the firewall by using a series of procedures which is initiated by the identified second mediation apparatus and enables the second mediation apparatus to receive information from the first mediation apparatus through the firewall, the second command including a third device ID matching the second device ID and second instruction information based on the first instruction information in the second command; and transmitting a first response as a response to the first command to the management server via the internet. The second mediation apparatus includes a second control device configured to perform: initiating the series of procedures; receiving the second command through the firewall; transmitting a third command to the device identified by the third device ID, the third command including third instruction information based on the second instruction information; and transmitting a second response as a response to the second command to the first mediation apparatus through the firewall.

BRIEF DESCRIPTION OF THE DRAWINGS

The particular features and advantages of the disclosure as well as other objects will become apparent from the following description taken in connection with the accompanying drawings, in which:

FIG. 1 is a block diagram illustrating a management system according to an embodiment;

FIG. 2 is a table illustrating a correlation database;

FIG. 7(A) is a sequence diagram illustrating a process executed by the management server and the outside mediation apparatus for deleting the device ID from the management server;

FIG. 7(B) is a sequence diagram illustrating a process executed by two different programs in the inside mediation apparatus for generating a command for a newly added printer explained in a fifth variation;

DETAILED DESCRIPTION

Figure 3:
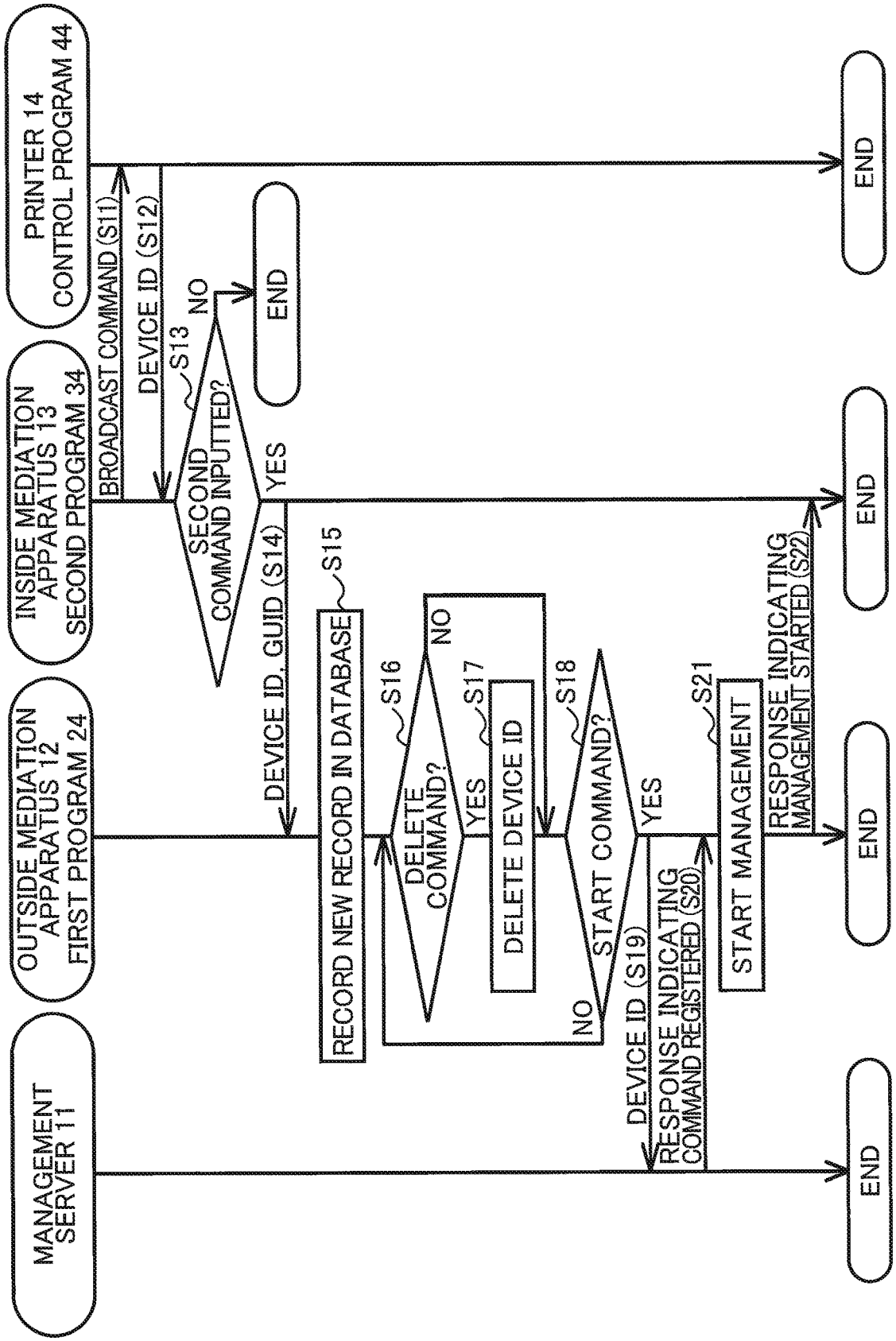
FIG. 3 is a sequence diagram illustrating a process executed by a management server, an outside mediation apparatus, an inside mediation apparatus, and a printer for recording device ID of the printer in the management server.

An embodiment will be described while referring to the drawings. It would be apparent to those skilled in the art that various changes and modifications may be made thereto. For example, an order of steps and processes may be changed arbitrary if such modifications do not depart from the concept of the invention.

FIG. 1 shows a management system 10 according to the embodiment. The management system 10 employs an MDM system to manage printers 14. An administrator of an outside mediation apparatus 12 for managing the printers 14 can use a browser to access an outside mediation apparatus 11 and view management information on the printers 14 stored on the management server 11, or can specify changes or the like to settings information for the printers 14 through the management server 11.

The management system 10 also manages the printers 14 that do not possess a function to communicate directly with the management server 11 (for example, a function to connect to an Internet 15). The management server 11 uses the outside mediation apparatus 12 and the inside mediation apparatuses 13 to manage the printers 14 which do not have a function to communicate directly with the management server 11. This management process will be described later in greater detail. The printer 14 is an example of the device in the present disclosure.

The management system 10 is provided with the management server 11 and the outside mediation apparatus 12 that are connected to the Internet 15, and the inside mediation apparatuses 13 and the printers 14 that are connected to local area networks 16. The outside mediation apparatus 12 connected to the Internet 15 and the inside mediation apparatuses 13 connected to local area networks 16 are examples of communication systems.

The management server 11 belongs to a company that provides a service for managing mobile devices (an MDM service), for example. The outside mediation apparatus 12 belongs to a company that uses this MDM service, for example. The inside mediation apparatuses 13 are servers or personal computers deployed at branch offices of the company utilizing the MDM service, for example. The local area networks 16 are configured at each of these company branches, for example. Each branch office possesses one or more printers 14. The printers 14 at each branch are connected to the local area network 16 provided at that branch.

The example in FIG. 1 illustrates three local area networks 16 configured at corresponding branches, and two or three printers 14 connected to each local area network 16. However, the number of local area networks 16 included in the management system 10 and the number of printers 14 connected to each local area network 16 are not limited to the numbers in this example.

The management server 11 and the outside mediation apparatus 12 can communicate with each other through the Internet 15. More specifically, the management server 11 and the outside mediation apparatus 12 each have a global IP address and communicate with each other using the Internet Protocol, which employs global IP addresses.

The local area network 16 is an intranet that is configured of a wired LAN, wireless LAN, WAN, or a combination of these, for example. The inside mediation apparatus 13 and the printers 14 connected to each local area network 16 can communicate with each other using a communication protocol such as TCP/IP. More specifically, the inside mediation apparatus 13 and the printers 14 communicate with each other using private IP addresses or MAC addresses.

Each local area network 16 has a relay device (not shown) such as a router. The relay device has a global IP address and is connected to the Internet 15. The inside mediation apparatus 13 connected to each local area network 16 communicates with the outside mediation apparatus 12 via the relay device. Specifically, the inside mediation apparatus 13 and the outside mediation apparatus 12 communicate with each other through a firewall configured by the relay device. So, the outside mediation apparatus 12 is a mediation apparatus located outside the firewall and the inside mediation apparatus 13 is a mediation apparatus located inside the firewall. In this example, the inside mediation apparatus 13 is a local mediation apparatus located in the local area network 16 for mediating communications between the outside mediation apparatus and a plurality of devices (printers 14) located in the local area network 16, and the outside mediation apparatus 12 is a global mediation apparatus for mediating communications between the management server 11 and the plurality of inside mediation apparatus 13.

The management system 10 uses the outside mediation apparatus 12 and the inside mediation apparatuses 13 having the constructions described above to enable the management server 11 to manage the printers 14 that do not possess a function for communicating directly with the management server 11. Specifically, a first program 24 installed and executed on the outside mediation apparatus 12 and a second program 34 installed and executed on each inside mediation apparatus 13 are used to manage the printers 14 without a function to communicate directly with the management server 11. That is, management by the management server 11 of the printers 14 unable to communicate directly with the management server 11 is implemented by the first program 24 and the second program 34. Next, the structures of the outside mediation apparatus 12, the inside mediation apparatuses 13, and the printers 14 will be described in greater detail. The first program 24 and the second program 34 are examples of the programs in the disclosure.

The outside mediation apparatus 12 is provided with a CPU 21, a memory 22, a communication interface 25, a user interface 26, and a communication bus 27. The CPU 21, the memory 22, the communication interface 25, and the user interface 26 are connected to the communication bus 27. The CPU 21 is an example of the first computer. The CPU 21 and the memory 22 are an example of the first control device.

The memory 22 may be configured of ROM, RAM, EEPROM, a hard disk drive, a portable storage medium such as USB memory, or a buffer provided in the CPU 21. The memory 22 may be any storage medium that can be read by a computer. A computer-readable storage medium is a non-transitory medium. In addition to the above example, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium. This description also applies to a memory 32 provided in the inside mediation apparatus 13 described later and a memory 42 provided in the printer 14 described later.

The memory 22 has a program storage area 28, and a data storage area 29. The program storage area 28 stores an operating system (OS) 23, a first program 24, and other programs.

The OS 23 is a basic program of the outside mediation apparatus 12. The OS 23 is any operating system such as Mac OS (registered trademark), Windows (registered trademark), Linux (registered trademark), or Android (registered trademark).

The first program 24 controls communications with the management server 11 and the inside mediation apparatuses 13 via the communication interface 25 in cooperation with the OS 23. The first program 24 may be a single program or an aggregate of programs. The process executed by the first program 24 will be described later.

The data storage area 29 stores data required for executing programs. The data storage area 29 also stores a correlation database DB shown in FIG. 2.

The correlation database DB correlates a plurality of items in a plurality of records. The items include "Device ID," "GUID," "Location Information," "Firmware Version," "Settings Information," "Modified Date," and "Condition Information." The correlation database DB may include items other than those described above.

The item "Device ID" specifies an ID assigned to the printer 14 for identifying the printer 14. The device ID may be a MAC address, an IP address, or a serial number for the printer 14, for example. The device ID is used to differentiate individual records in the correlation database DB. In other words, a single record is generated for each printer 14.

The item "GUID" specifies a globally unique identifier (GUID) assigned to the inside mediation apparatus 13 or the second program 34. That is, the item "GUID" specifies the inside mediation apparatus 13 to which the printer 14 identified by the device ID belongs. "The inside mediation apparatus 13 to which the printer 14 belongs" denotes the inside mediation apparatus 13 that is connected to the same local area network 16 to which the printer 14 is connected. Note that a single second program 34 is installed for each inside mediation apparatus 13. Therefore, the GUID may be assigned to the inside mediation apparatus 13 or the second program 34 for identifying thereof. The GUID is an example of the mediation device ID. Here, numbers, letters, or any other characters or the like capable of identifying the inside mediation apparatus 13 may be used as the GUID. The same is true for the device ID.

The item "Location Information" specifies the local area network 16 to which the inside mediation apparatus 13 designated by the item "GUID" belongs. The item "Location Information" may be a branch name, for example.

The item "Firmware Version" specifies the version of a control program 44 (described later) installed on the printer 14. Larger numbers in item "Firmware Version" indicate newer versions.

The item "Settings Information" is subdivided into a plurality of items including "Font," "Font Size," and "Density." The item "Font" indicates the font for characters printed by the printer 14. The item "Font Size" indicates the size of characters printed by the printer 14. The item "Density" indicates the density of ink that the printer 14 uses to print text and graphics. In addition to these items, the item "Settings Information" may include other items, such as an item specifying whether the automatic power-off function is enabled or disabled, an item specifying the printing speed, and an item specifying communication parameters.

The item "Modified Date" indicates the date at which content for any item in the record was last modified. The item may include "Modified Date and Time" instead of "Modified Date". In this case, the item "Modified Date and Time" indicates the date and time at which content for any item in the record was last updated.

The item "Condition Information" indicates whether the printer 14 corresponding to the record is under management of the management system 10. For this item, "Managing" denotes that the printer 14 is currently under the management of the management system 10, while "Waiting" denotes that the printer 14 is not currently under the management of the management system 10.

The communication interface 25 of the outside mediation apparatus 12 shown in FIG. 1 can communicate with the management server 11 and the inside mediation apparatus 13. The communication interface 25 is a LAN interface or a wireless LAN interface. The outside mediation apparatus 12 communicates with the inside mediation apparatus 13 via the communication interface 25, the Internet 15, the firewall (relay device), the local area network 16, and a communication interface 35 of the inside mediation apparatus 13 described later.

The user interface 26 includes a keyboard, mouse, and the like. The user interface 26 accepts input from the administrator of the outside mediation apparatus 12.

The inside mediation apparatus 13 is provided with a CPU 31, a memory 32, a communication interface 35, a user interface 36, and a communication bus 37. The structures of the CPU 31, the memory 32, the communication interface 35, the user interface 36, and the communication bus 37 are identical to those of the CPU 21, the memory 22, the communication interface 25, the user interface 26, and the communication bus 27. The CPU 31 is an example of the second computer. The CPU 31 and the memory 32 are an example of the second control device.

The memory 32 has a program storage area 38, and a data storage area 39. The program storage area 38 stores programs such as an OS 33, and a second program 34. The data storage area 39 stores data required for executing the programs. The inside mediation apparatus 13 stores a GUID identifying itself in the data storage area 39.

The OS 33 is a basic program for the inside mediation apparatus 13. The second program 34 controls communications with the outside mediation apparatus 12 and the printers 14 via the communication interface 35 in cooperation with the OS 33. The second program 34 may be a single program or an aggregate of programs. The process executed by the second program 34 will be described later.

The communication interface 35 can communicate with the outside mediation apparatus 12 and the printers 14. The communication interface 35 is a LAN interface or a wireless LAN interface.

Each printer 14 is provided with a CPU 41, a memory 42, a communication interface 45, a battery 50, a printing engine 51, and a communication bus 47. The CPU 41, the memory 42, the communication interface 45, and the communication bus 47 have the same structures as the CPU 21, the memory 22, the communication interface 25, and the communication bus 27.

The memory 42 has a program storage area 48, and a data storage area 49. The program storage area 48 stores programs such as an OS 43, and a control program 44. The data storage area 49 stores data required for executing the programs. The printer 41 stores a device ID identifying itself in the data storage area 49. The device ID may be the MAC address, the private IP address, or the serial number of the printer 14, for example.

The OS 43 is a basic program for the printer 14. The control program 44 controls the printing engine 51 to execute printing and controls communications with the inside mediation apparatus 13 via the communication interface 45 in cooperation with the OS 43. The control program 44 may be a single program or an aggregate of programs. The process executed by the control program 44 will be described later.

The communication interface 45 can communicate with the inside mediation apparatus 13. The communication interface 45 receives commands from the inside mediation apparatus 13 and transmits responses to these commands to the inside mediation apparatus 13.

The battery 50 is a rechargeable battery, for example. When the printer 14 is connected to a commercial power supply, the battery 50 is charged by the commercial power supply. When the printer 14 is not connected to a commercial power supply, the battery 50 discharges to supply a drive power to the printing engine 51 and the CPU 41.

Next, the processes executed by the first program 24, the second program 34, and the control program 44 will be described.

In general, sequence diagrams in this specification depict steps performed by the CPUs 21, 31. and 41 according to instructions described in programs. In other words, actions such as "determine," "extract," "select," "calculate," "decide," "identify," "acquire", "receive", "control," and, "set" the like in the following description represent steps performed by the CPUs 21, 31, and 41. Steps performed by the CPU include processes that control hardware through the OS. "Acquiring" is used as a concept which does not necessarily require a request. That is, a concept represented by "the CPU acquires data" includes a process in which the CPU acquires data without requesting thereof. Further, "data" in this specification represents bit strings that a computer can read. Further, data of different formats are treated as the same data when the content of the data is essentially the same. The same holds true for "information" in this specification. The processes for "command", "response" and "request" are executed by communicating respective information indicating "command", "response", and "request". The words "command", "response", and "request" may respectively indicate information indicating "instruction", "response", and "request".

Further, steps performed by the CPU according to instructions described in a program may be described in abbreviated terms, such as "the CPU 21 executes" or "the first program 24 executes" or "the outside mediation apparatus 12 executes." The same holds true for the CPUs 31 and 41. Similarly, the input and output of information performed by a program via a communication interface or user interface may be described in abbreviated terms, such as "the CPU 21 receives," "the first program 24 transmits," or "the outside mediation apparatus 12 acquires."

Further, a process performed by the CPU to determine whether information A indicates circumstance B may be described conceptually as "determining whether circumstance B based on information A." A process in which the CPU determines whether information A indicates circumstance B or circumstance C may be described conceptually as "determining whether circumstance B or circumstance C based on information A."

The terms "data" and "information" used in this specification share aspects of being bits or bit strings that computers can handle. The computer treats "data" without considering the significance of its individual bits. In the case of "information," on the other hand, the computer's operations branch based on the significance of the individual bits. Additionally, a "command" is a control signal prompting the destination device to perform the next operation. A command may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between data and information is not strictly enforced; exceptions to the rule may be allowed. For example, data may be temporarily treated as information, while information may be temporarily treated as data. Further, certain bits or bit strings may be treated as data on one device and information on another. Further, information may be extracted from data, and data may be extracted from information.

Further, the phrase "in response to" in this specification indicates that the process specified is to be executed when the condition specified after the phrase has been met. Note that the timing at which the process is executed should be after the condition has been met, but need not be immediately after the condition is met.

Next, processes executed by the first program 24 of the outside mediation apparatus 12, the second program 34 of the inside mediation apparatus 13, and the control program 44 of the printer 14 will be described with reference to FIGS. 3-7. Note that the second program 34 periodically transmits HTTP request to the first program 24. The firewall blocks data transmissions from the outside mediation apparatus 12 to the inside mediation apparatus 13 other than HTTP responses which are responses to the HTTP requests received from the inside mediation apparatus 13.

First, the process of recording the device ID of the printer 14 in the correlation database DB stored in the memory 22 of the outside mediation apparatus 12 and initiating management of the printer 14 on the management system 10 will be described with reference to FIG. 3.

In S11 of FIG. 3 the second program 34 of the inside mediation apparatus 13 broadcasts a command over the local area network 16 requesting printers 14 to return (or transmit) their device IDs. For example, when the second program 34 is started for the first time, the second program 34 executes an initial setup. During this initial setup, the operator of the inside mediation apparatus 13 may issue a registration command to register printers 14 to be managed on the management system 10. Alternatively, the registration command may be received from the first program 24 of the outside mediation apparatus 12. In response to the registration command, the second program 34 of the inside mediation apparatus 13 broadcasts the command for printers 14 to return (or transmit) their device IDs. The registration command may be a command to add one or more printers 14 to a management system 10 already in existence, i.e., to register one or more printers 14 in the management system 10. The "operator" is a person that manages the printers 14 at the corresponding branch office, for example, and not the administrator that operates the outside mediation apparatus 12. In other words, the operator is a person that manages devices in the local area network 16 such as the printers and the inside mediation apparatus 13 and the administrator is a person that manages devices outside the firewall such as the outside mediation apparatus 12. The process of S11 is an example of the searching steps (or means). As will be described later, the outside mediation apparatus 12 transmits an HTTP response that includes information such as a command to the inside mediation apparatus 13 in response to an HTTP request received from the inside mediation apparatus 13.

In S11 the printers 14 receive this command when the printers 14 are connected to the same local area network 16 over which the second program 34 of the inside mediation apparatus 13 broadcast the command. In S12 the control program 44 of each printer 14 receiving the command returns (or transmits) a response that includes the device ID identifying itself.

In S12 the second program 34 of the inside mediation apparatus 13 receives the response from the control program 44 of the printer 14. In S13 the second program 34 determines whether a send command has been inputted. For example, in response to receiving a response including the device ID of a printer 14, the second program 34 displays this device ID on the display of the inside mediation apparatus 13. The operator determines whether the device ID displayed on the display is the device ID of a printer 14 targeted for management. The operator inputs a send command into the inside mediation apparatus 13 when determining that the device ID displayed on the display is the device ID of a printer 14 targeted for management. However, if the operator determines that the device ID does not belong to a printer 14 targeted for management, the operator inputs into a command to delete the device ID. In other words, the operator of the inside mediation apparatus 13 at each branch office confirms whether each device ID collected through the broadcast is the device ID of a printer 14 to be managed with the management system 10.

If the second program 34 of the inside mediation apparatus 13 determines that a command not to send any of the collected device ID was inputted (S13: NO), the second program 34 ends the process without transmitting any of the collected device IDs to the outside mediation apparatus 12. The second program 34 may determine that the command not to send any of the collected device ID was inputted when no send command to send any of the collected device IDs was inputted. However, if a send command was inputted (S13: YES), in S14 the second program 34 transmits an HTTP request to the outside mediation apparatus 12. Here, the second program 34 transmits the HTTP request including the collected device IDs and its own GUID stored in the memory 32. When a plurality of device IDs was collected, each device ID may be transmitted individually to the outside mediation apparatus 12 or all of the collected device IDs may be transmitted together to the outside mediation apparatus 12. The HTTP request transmitted in S14 may be one of the HTTP requests that the inside mediation apparatus 13 transmits periodically to the outside mediation apparatus 12 or may be a separate HTTP request from the periodically transmitted requests.

In S14 the outside mediation apparatus 12 receives the HTTP request including device IDs and the GUID from the second program 34 of the inside mediation apparatus 13. In response to receiving the device IDs and the GUID, in S15 the first program 24 of the outside mediation apparatus 12 determines whether each received device ID is already recorded in the correlation database DB and, when not recorded in the correlation database DB, records a new record including the device ID and the GUID in the correlation database DB. The process of S15 is an example of the first storing step or means and the storing process.

Although not indicated in the sequence diagram, the first program 24 of the outside mediation apparatus 12 also returns (or transmits) an HTTP response to the inside mediation apparatus 13 as a response to the HTTP request received in S14. The HTTP response includes information specifying that the device ID was received. Alternatively, the first program 24 of the outside mediation apparatus 12 may transmit an HTTP response that includes all device IDs that were recorded in the correlation database DB to the inside mediation apparatus 13 in response to the HTTP request received in S14. In response to receiving the HTTP response that includes all device IDs that were recorded in the correlation database DB, the second program 34 of the inside mediation apparatus 13 stores the device IDs included in this HTTP response in the memory 32. The second program 34 displays the device IDs stored in the memory 32 on the display of the inside mediation apparatus 13 in response to receiving the HTTP response or in response to a command inputted by the operator. Thus, the operator can confirm the device IDs that are recorded in the correlation database DB from the device IDs displayed on the display.

When a new record is added to the correlation database DB, the initial value "Waiting" is stored under the item "Condition Information." In the example of FIG. 2, the record for a printer 14 having device ID "009" was newly added. Printers 14 having records whose Condition Information indicates "Waiting" have not yet been registered on the management server 11. These printers 14 are not under the management of the management system 10 and can be said to be in a provisional registration state. The item "Condition Information" in records for printers 14 under management has been changed from "Waiting" to "Managing."

If one of the received device IDs has already been registered in the correlation database DB, the first program 24 of the outside mediation apparatus 12 transmits a response to the inside mediation apparatus 13 indicating that the device ID is already registered.

In S16 the first program 24 of the outside mediation apparatus 12 determines whether a delete command to delete a record was inputted. The delete command may be a command that the administrator inputs on the outside mediation apparatus 12, for example. When a new record is generated, the first program 24 displays information on the display of the outside mediation apparatus 12 indicating that one or more records were generated and recorded in the correlation database DB, for example. When seeing this display, the administrator may instruct the display of the outside mediation apparatus 12 to display the correlation database DB, and determine whether one or more printers 14 having the Condition Information "Waiting" are printers 14 to be targeted for management. The administrator inputs a delete command for one or more device IDs of printers 14 not to be managed with the management system 10. In other words, the operator of each inside mediation apparatus 13 confirms whether each device ID should be recorded in the correlation database DB, and subsequently the administrator of the outside mediation apparatus 12 confirms whether each device ID should be recorded in the correlation database DB. Note that step S13 performed by the second program 34 may be omitted so that only the administrator of the outside mediation apparatus 12 confirms whether device IDs should be recorded in the correlation database DB. In other words, the second program 34 may transmit all device IDs received from printers 14 to the outside mediation apparatus 12 without receiving confirmation from the operator of the inside mediation apparatus 13.

If the first program 24 of the outside mediation apparatus 12 determines that a delete command was inputted (S16: YES), in S17 the first program 24 deletes the record designated by the delete command from the correlation database DB. However, if the first program 24 determines that a delete command was not inputted (S16: NO), the first program 24 skips S17.

In S18 the first program 24 determines whether a management start command for initiating management on the management system 10 has been inputted by the operator. When NO determination is made in S18, the first program 24 return to S16. The first program 24 may continue to wait while a management start command was not inputted (S18: NO). When the first program 24 determines that a management start command was inputted (S18: YES), in S19 the first program 24 transmits a command to the management server 11. This command includes the device IDs that have been recorded in the correlation database DB as accompanying information. This command also requests the management server 11 to register the accompanying device IDs as device IDs for printers 14 under management. The process of S19 is an example of the registration requesting step or means and the registration request process. The process of S18 for receiving a management start command is an example of the receiving step or means.

Note that the first program 24 of the outside mediation apparatus 12 may also receive an inputted command in S18 declining to initiate management. In this case, the first program 24 performs none of steps S19-22, but performs a process totransmit an HTTP response to the second program 34 of the inside mediation apparatus 13 specifying that the command for declining to initiate management is inputted. In response to receiving this HTTP response, the second program 34 displays information on the display of the inside mediation apparatus 13 specifying that the command declining to initiate management was inputted on the outside mediation apparatus 12. Based on this information displayed on the display, the operator of the inside mediation apparatus 13 can confirm that such a command was inputted on the outside mediation apparatus 12.

In S19 the management server 11 receives the command transmitted from the outside mediation apparatus 12. In response to receiving the command, the management server 11 stores the device IDs included in the command in a memory (not shown). In other words, the management server 11 registers the device IDs included in the command as device IDs for printers 14 under management. In S20 the management server 11 transmits a response to the outside mediation apparatus 12 via the Internet 15 indicating that the device IDs included in the command have been registered.

In S20 the outside mediation apparatus 12 receives the response from the management server 11. In response to receiving this response from the management server 11, in S21 the first program 24 of the outside mediation apparatus 12 starts management on the management system 10. More specifically, the first program 24 changes the "Condition Information" in the database shown in FIG. 2 from "Waiting" to "Managing" for printers having the device IDs included in the command transmitted in S19. The process for changing the "Condition Information" in the database from "Waiting" to "Managing" is an example of the modifying means. "Waiting" in the item "Condition Information" is an example of the waiting-state information, and "Managing" in the item "Condition Information" is an example of the management start information or managing-state information.

In S22 the first program 24 transmits an HTTP response to the inside mediation apparatus 13 in response to one of HTTP requests periodically received from the inside mediation apparatus 13. The HTTP response transmitted to the inside mediation apparatus 13 includes the device IDs in records having the Condition Information "Managing," i.e., the device IDs for printers 14 for which management was initiated. At this time, the first program 24 does not transmit device IDs that were deleted in S17.

Note that the first program 24 of the outside mediation apparatus 12 may also transmit the HTTP response to the inside mediation apparatus 13 in S22 as a response to the HTTP request received in S14. In this case, steps S16 and S17 may be omitted to avoid the occurrence of a timeout.

Although not indicated in the sequence diagram, the second program 34 of the inside mediation apparatus 13 stores device IDs for which management has been initiated in the memory 32 in response to receiving such device IDs in the HTTP response in S22. The operator instructs the display of the inside mediation apparatus 13 to display the device IDs stored in the memory 32. Based on this instruction, the second program 34 displays on the display of the inside mediation apparatus 13 information indicating that device IDs were received for printers 14 for which management has been initiated in order to notify the operator of the information. Accordingly, the operator can confirm the printers 14 for which management has begun by the information on the display. Note that the administrator of the outside mediation apparatus 12 can also confirm the printers 14 for which management has begun by instructing the display of the outside mediation apparatus 12 to display the correlation database DB stored in the memory 22. Additionally, both the operator of the inside mediation apparatus 13 and the administrator of the outside mediation apparatus 12 can confirm printers 14 for which management has begun by using a browser to display data stored on the management server 11 on a display of a device such as a terminal device, a PC and the outside mediation apparatus 12.

In response to an instruction from the management server 11, a command is inputted into each printer 14 having device ID whose record in the correlation database DB has "Managing" in the item "Condition Information". In other words, the management server 11 manages the printers 14. This management will be described in greater detail with reference to FIGS. 4 and 5. Note that the administrator inputs instructions into the management server 11 through a browser.

Figure 4:
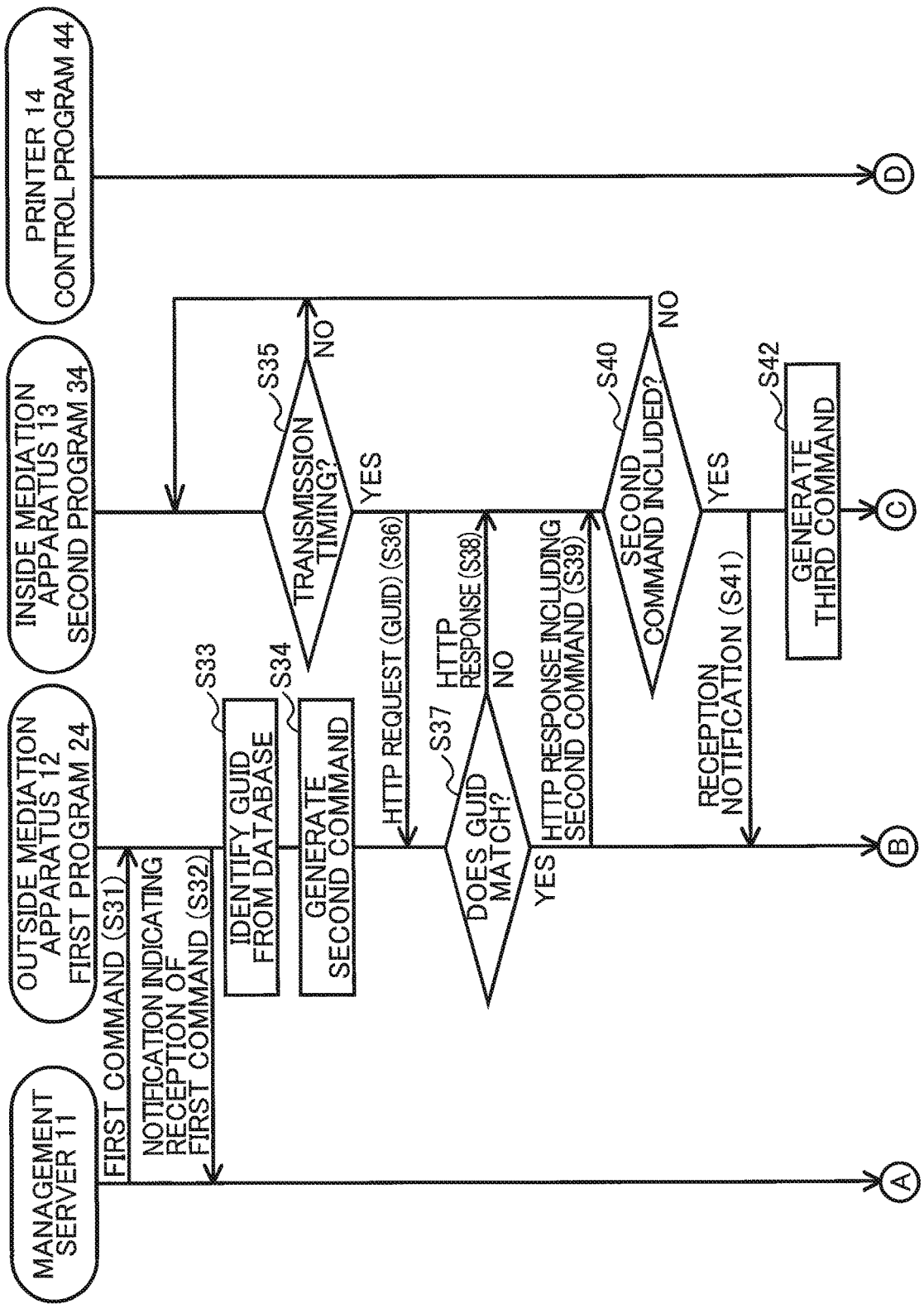
FIG. 4 is a sequence diagram illustrating a part of a process executed by the management server, the outside mediation apparatus, the inside mediation apparatus, and the printer for instructing the printer to execute a command from the management server.

In S31 of FIG. 4, the management server 11 transmits a first command to the outside mediation apparatus 12. The first command instructs the outside mediation apparatus 12 to issue a command which triggers the printer 14 to execute an instruction or a process. The first command includes a device ID as accompanying information for identifying the printer 14 that will execute the instruction.

The first command includes, as a content, instruction information for instructing the outside mediation apparatus 12 to modify settings in the printer 14 for one of the items "Font," "Font Size," or "Density" under the settings information (see FIG. 2), instruction information for instructing to update the firmware version for the control program 44 of the printer 14 (see FIG. 2), or instruction information for requesting a printer 14 to return (transmit) its current status information, for example. The status information of the printer 14 may indicate status or settings of the printer 14 and may include values set to the printer 14 (for example, values corresponding to the item Settings Information in the correlation database DB). However, the content specified by the first command is not limited to that described above. The content in the first command is an example of the instruction information. The first command requesting status information is an example of the first request command.

In S31 the first program 24 of the outside mediation apparatus 12 receives the first command from the management server 11. The process of S31 for receiving the first command is an example of the first receiving step or means and the first reception process.

In response to receiving the first command, in S32 the first program 24 of the outside mediation apparatus 12 transmits a notification to the management server 11 indicating that the first command was received.

After receiving the first command, in S33 the first program 24 of the outside mediation apparatus 12 identifies the GUID associated with the device ID included in the first command by referencing the correlation database DB. In other words, by identifying the GUID, the first program 24 identifies the inside mediation apparatus 13 on the local area network 16 to which the printer 14, as a destination target of the instructions, belongs. More specifically, the first program 24 identifies the record in the correlation database DB having the device ID included in the first command and acquires the corresponding GUID under the item "GUID" in the identified record. The process of S33 for acquiring the GUID is an example of the identifying means or step and the identification process.

In S34 the first program 24 generates a second command according to the instruction information in the first command. The second command is a command that can be inputted into (or interpreted by) the inside mediation apparatus 13 and includes as a content, instruction information which is generated based on the content (instruction information) in the first command. The second command includes, as accompanying information, the device ID included in the first command.

While not shown in FIG. 1, the data storage area 29 in the memory 22 of the outside mediation apparatus 12 stores a first command list. The first command list specifies correlations between first commands and second commands. In S34 the first program 24 of the outside mediation apparatus 12 generates the second command by extracting from the first command list the second command that is associated with the first command received in S31 and by adding the device ID included in the first command to the second command as accompanying information.

While not shown in the sequence diagram, if the first command includes instruction information for instructing to transmit a file to the printer 14, the first program 24 of the outside mediation apparatus 12 requests the management server 11 to transmit the file. In response to receiving this request, the management server 11 transmits the file to the outside mediation apparatus 12. The first program 24 receives the file and stores the file in the memory 22. Some examples of files to be transmitted to the printer 14 are a file containing text instructing a setting modification on the printer 14, and a program file for a new version of the control program 44. In a case where the file is received from the management server 11, in S34 the first program 24 generates a second command having instruction information for instructing the second program 34 of the inside mediation apparatus 13 to download the file.

After generating the second command, the first program 24 waits until an HTTP request has been received from the inside mediation apparatus 13.

In the meantime, in S35 the second program 34 of the inside mediation apparatus 13 determines whether a transmission timing has arrived and repeatedly performs this determination while the transmission timing has not arrived (S35: NO). Here, the transmission timing is indicated by data stored in the memory 32. The transmission timing is set to an interval of a few seconds to a few tens of seconds, such as a 10-second, 15-second, or 20-second interval. The transmission timing is an example of the first prescribed interval.

If the second program 34 of the inside mediation apparatus 13 determines that the transmission timing has arrived (S35: YES), in S36 the second program 34 transmits an HTTP request including its own GUID to the outside mediation apparatus 12. Here, the outside mediation apparatus 12 can transmit the second command to the inside mediation apparatus 13 through the firewall by including the second command in an HTTP response which is a response to an HTTP request received from the inside mediation apparatus 13. The firewall blocks transmissions from the outside mediation apparatus 12 to the inside mediation apparatus 13 other than HTTP responses which are responses to HTTP requests received from the inside mediation apparatus 13. For this reason, the inside mediation apparatus 13 transmits an HTTP request to the outside mediation apparatus 12 periodically. The process of S35 and S36 for periodically transmitting HTTP requests is an example of the setting up means or step and the setup process.

In S36 the first program 24 of the outside mediation apparatus 12 receives the HTTP request from the inside mediation apparatus 13. In S37 the first program 24 determines whether the GUID included in the HTTP request matches the GUID identified in S33. In other words, the first program 24 determines whether the inside mediation apparatus 13 that transmitted the HTTP request is the inside mediation apparatus 13 to which the second command generated in S34 is to be transmitted.

If the first program 24 determines that the GUID included in the HTTP request received in S36 does not match the GUID identified in S33 (S37: NO), in S38 the first program 24 transmits to the second program 34 an HTTP response that does not include the second command. The HTTP response transmitted in S38 specifies that the HTTP request transmitted in S36 was received.

However, if the first program 24 determines that the GUID included in the HTTP request received in S36 matches the GUID identified in S33 (S37: YES), in S39 the first program 24 transmits to the second program 34 an HTTP response that includes the second command. The process in S39 for transmitting an HTTP response that includes the second command is an example of the second transmitting means or steps and the second transmission process. The second command requesting status information of the printer 14 is an example of the second request command.

In S38 or S39 the second program 34 of the inside mediation apparatus 13 receives an HTTP response from the outside mediation apparatus 12. In S40 the second program 34 determines whether the HTTP response includes a second command. If the second program 34 determines that the HTTP response does not include a second command (S40: NO), the second program 34 continues to transmit periodic HTTP requests. The process of S39 for receiving an HTTP response that includes a second command is an example of the second receiving means or step and the second reception process.

However, if the second program 34 determines that the HTTP response includes a second command (S40: YES), in S41 the second program 34 transmits an HTTP request to the outside mediation apparatus 12 that includes a notification specifying that the second command was received (hereinafter called a "reception notification"). In other words, the second program 34 notifies the outside mediation apparatus 12 that the second command was received. As described above, the first program 24 of the outside mediation apparatus 12 returns (transmits) the second command as an HTTP response to an HTTP request received from the inside mediation apparatus 13. Therefore, if the outside mediation apparatus 12 does not receive a reception notification from the inside mediation apparatus 13, the first program 24 of the outside mediation apparatus 12 cannot determine whether the inside mediation apparatus 13 was able to receive the second command until the first program 24 receives a response corresponding to the second command in S55 or S62 described later. In such a case, the time required for the outside mediation apparatus 12 to receive a response corresponding to the second command would exceed the prescribed time which is set as the time interval to wait until re-sending the second command, resulting in the outside mediation apparatus 12 re-sending the second command even if the inside mediation apparatus 13 has already received the second command. In the embodiment, the second program 34 of the inside mediation apparatus 13 transmits the reception notification to the outside mediation apparatus 12 prior to transmitting the response corresponding to the second command (S55 or S62). This action prevents the outside mediation apparatus 12 from re-sending the second command despite the inside mediation apparatus 13 having already received the command. The process of S41 for transmitting a reception notification to the outside mediation apparatus 12 is an example of the reception notifying means or step.

In S41 the first program 24 of the outside mediation apparatus 12 receives the HTTP request that includes the reception notification. While not shown in the sequence diagram, if the first program 24 determines that an HTTP request including a reception notification has not been received within the prescribed time, the first program 24 re-sends the second command to the inside mediation apparatus 13 as an HTTP response to an HTTP request transmitted periodically from the inside mediation apparatus 13. In response to receiving the HTTP request including the reception notification, the first program 24 returns (transmit) an HTTP response to the inside mediation apparatus 13 indicating that the reception notification was received.

After completing the process of S41, in S42 the second program 34 of the inside mediation apparatus 13 generates a third command to be transmitted to the printer 14. The third command is a command that can be inputted into (or interpreted by) the printer 14 and includes, as a content, instruction information corresponding to the instruction information in the second command.

While not shown in FIG. 1, the data storage area 39 in the memory 32 of the inside mediation apparatus 13 stores a second command list specifying correlations between second commands and third commands. In S42 the second program 34 of the inside mediation apparatus 13 generates the third command by referencing the second command list and extracting from the second command list the third command associated with the second command received in S39. The process of S42 for generating the third command is an example of the second generating means or step. The third command is an example of the device command. The second command list is an example of the command list.

While not shown in the sequence diagram of FIG. 4, the second program 34 of the inside mediation apparatus 13 transmits an HTTP request that includes a file transmission request to the outside mediation apparatus 12 when the second command (specifically, the instruction information of the second command) received in S39 instructs the downloading of a file. In response to receiving this HTTP request, the first program 24 of the outside mediation apparatus 12 transmits an HTTP response including the file to the inside mediation apparatus 13 according to the transmission request included in the HTTP request. The second program 34 of the inside mediation apparatus 13 receives the file included in this HTTP response. The second program 34 generates a third command that includes the settings or programs in the received file. The file may be included in the second command, and the second command having the file may be transmitted from the first program 24 to the second program 34. In this case, the second program 34 need not transmit a file transmission request to the first program 24.

The second program 34 of the inside mediation apparatus 13 may determine based on a status request flag attached to the second command whether the instruction specified by the second command received in S39 is an instruction to acquire status information, or other instructions such as an instruction to modify settings information and an instruction to update the firmware version. For example, if the first command received in S31 has an instruction to request status information, the first program 24 of the outside mediation apparatus 12 attaches a status request flag set to ON to the second command.

Figure 5:
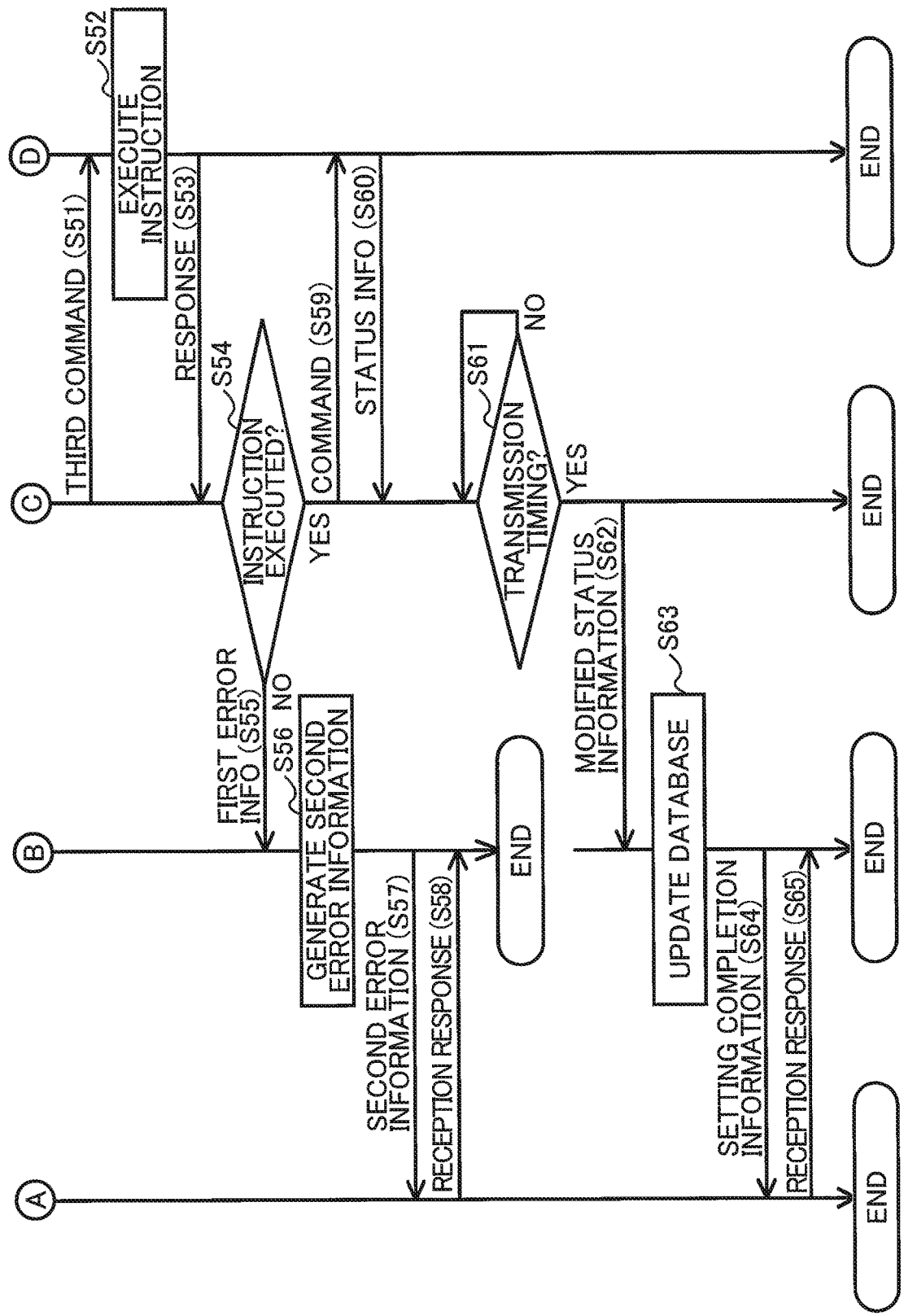
FIG. 5 is a sequence diagram illustrating a remaining part of the process instructing the printer to execute the command from the management server.
Figure 6:
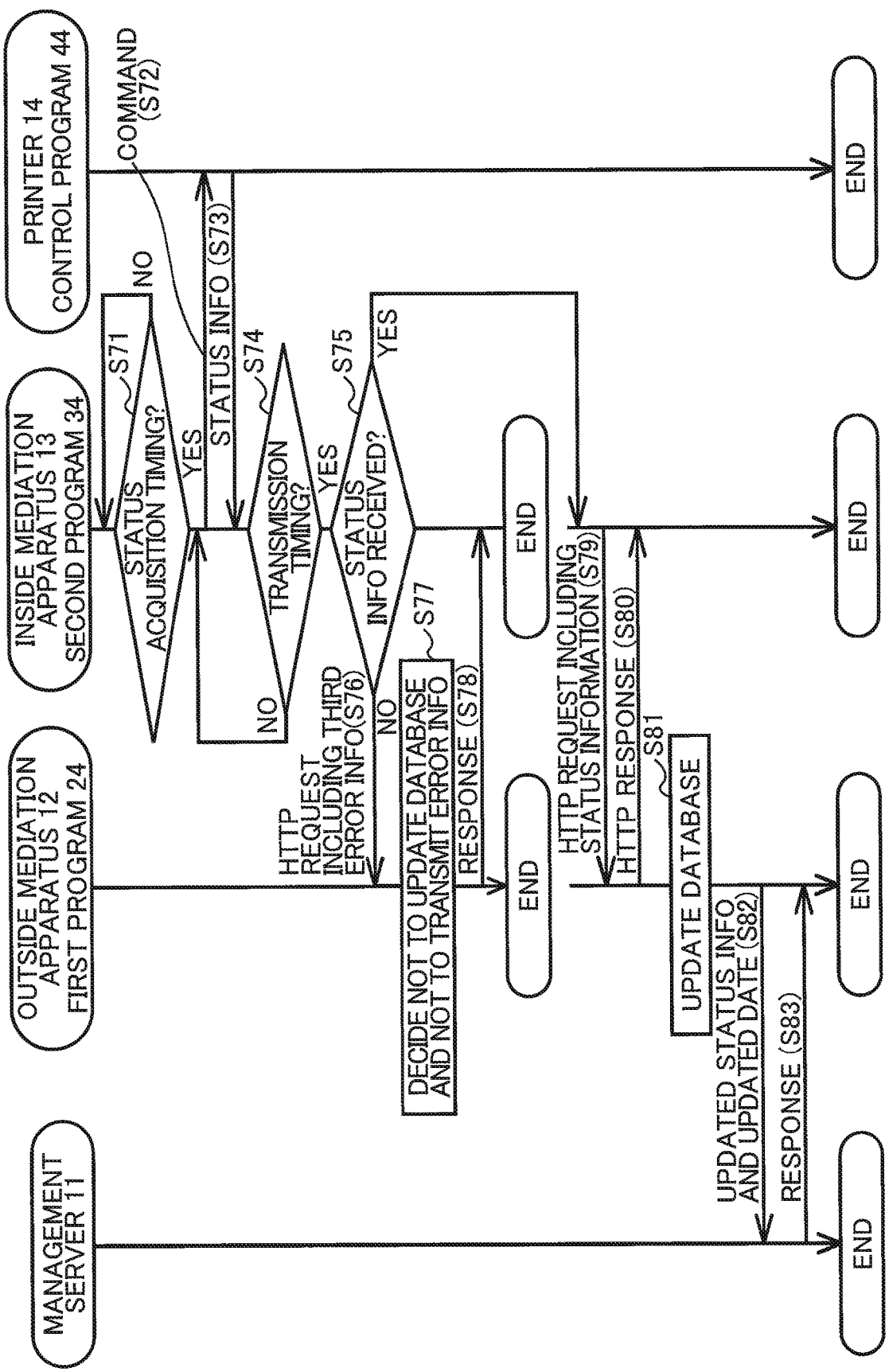
FIG. 6 is a sequence diagram illustrating a process executed by the management server, the outside mediation apparatus, the inside mediation apparatus, and the printer for periodically acquiring status information from printer.

After the second program 34 of the inside mediation apparatus 13 has generated the third command, in S51 of FIG. 5 the second program 34 transmits the third command to the printer 14 specified by the device ID included in the second command. The process of S51 for transmitting the third command to the printer 14 is an example of the third transmitting means or step and the third transmission process. The third command for requesting status information is an example of the third request command.

In S51 the printer 14 receives the third command from the inside mediation apparatus 13. In S52 the control program 44 of the printer 14 executes the instruction specified by the third command (specifically, the instruction information of the third command). For example, if the third command specifies an instruction to modify a setting in the printer 14 for each of the items in the settings information, including "Font," "Font Size," and "Density" (see FIG. 2), the control program 44 modifies the setting for each of "Font," "Font Size," and "Density" to a value included in the third command. If the third command is an instruction to update the firmware version, the control program 44 updates itself using the program included in the third command. If the third command is an instruction requesting that status information be returned (transmitted), in S53 the control program 44 returns (transmits) the status information of the printer 14 as a response to the third command. The process of S53 in which the printer 14 transmits a response to the inside mediation apparatus 13 is an example of the device responding means or step. The response transmitted in S53 is an example of the device response.

In S53 the control program 44 of the printer 14 transmits a response indicating that the instruction specified by the third command was executed or an error code indicating that the instruction was not executed to the inside mediation apparatus 13.

In S53 the second program 34 of the inside mediation apparatus 13 receives the response from the printer 14. In response to receiving the response from the printer 14, in S54 the second program 34 determines whether the printer 14 executed the instruction specified by the third command (the instruction information of the third command). The process of S53 for receiving the response from the printer 14 is an example of the device response receiving means or step.

While not shown in the flowchart, the second program 34 of the inside mediation apparatus 13 skips the process of S53 for receiving a response from the printer 14 and executes the process in S54 in the event that communications by TCP could not be established. For example, communications between the inside mediation apparatus 13 and the printer 14 may not be established if power to the printer 14 is off or if the printer 14 was removed from the branch office and is not connected to the local area network 16.

The second program 34 determines that the printer 14 executed the instruction specified by (the instruction information of) the third command (S54: YES) in a case where a response indicating that the instruction specified by (the instruction information of) the third command was executed is received in S53. The second program 34 determines that the printer 14 did not execute the instruction specified by (the instruction information of) the third command (S54: NO) in a case where an error code was received in S53. Alternatively, the second program 34 may determine that the printer 14 did not execute the instruction specified by (the instruction information of) the third command (S54: NO) in a case where it is determined that communications with the printer 14 is not be established.

If the second program 34 of the inside mediation apparatus 13 determines that the printer 14 did not execute the instruction specified by (the instruction information of) the third command (S54: NO), in S55 the second program 34 transmits, as a response to the second command, an HTTP request including first error information to the outside mediation apparatus 12. Note that the HTTP request transmitted in S55 may be one of the HTTP requests that the inside mediation apparatus 13 transmits periodically to the outside mediation apparatus 12 or may be a separate HTTP request from the periodically transmitted HTTP requests.

The first error information includes a first error code. The first error code may include the error code received as a response from the printer 14 in S53, an error code specifying that communications with the printer 14 could not be established, or the like. While not shown in FIG. 1, the data storage area 39 of the inside mediation apparatus 13 stores a first error correlation list specifying correlations between first error codes and error contents. In S55 the second program 34 may extract the first error code associated with the error content from the first error correlation list, generate first error information that includes the extracted first error code and the device ID of the printer 14, and transmit an HTTP request including the first error information.

In S55 the outside mediation apparatus 12 receives the first error information. In S56 the first program 24 of the outside mediation apparatus 12 generates second error information based on the first error information received from the inside mediation apparatus 13. The second error information includes a second error code in a format that the management server 11 can recognize. While not shown in FIG. 1, the data storage area 29 of the outside mediation apparatus 12 stores a second error correlation list specifying correlations between first error codes and second error codes. In S56 the first program 24 extracts the second error code from the second error correlation list that is correlated with the first error code in the first error information and generates second error information including the extracted second error code and the device ID that was included in the first error information.

In S57 the first program 24 of the outside mediation apparatus 12 transmits the second error information generated in S56 to the management server 11 as a response to the first command received in S31. In S57 the management server 11 receives the second error information. In response to receiving this second error information, in S58 the management server 11 transmits a reception response to the outside mediation apparatus 12 indicating that the second error information was received. In S58 the outside mediation apparatus 12 receives this reception response.

On the other hand, if in S54 the second program 34 of the inside mediation apparatus 13 determines that the printer 14 executed the content (the instruction information) in the third command (S54: YES), in S59 the second program 34 transmits a command to the printer 14 requesting status information. The status information is the settings information, firmware version, and the like. Note that the second program 34 skips steps S59 and S60 when the third command transmitted in S51 is an instruction requesting the return of status information from the printer 14. This is because the status information has already received in S53 in such case.

In response to receiving the command in S59 requesting the return of status information, in S60 the control program 44 of the printer 14 returns (transmits) its status information. In S60 the second program 34 of the inside mediation apparatus 13 receives the status information from the printer 14. The status information transmitted by the printer 14 is information indicating the status of the printer 14 after the control program 44 of the printer 14 executed the content of the third command in S52 (hereinafter, this status information is referred to as the status information modified after the modification in S52).

After receiving the status information, in S61 the second program 34 of the inside mediation apparatus 13 waits until the transmission timing for periodically transmitting the HTTP request has arrived (S61: NO). When the second program 34 determines that the transmission timing has arrived (S61: YES), in S62 the second program 34 transmits an HTTP request to the outside mediation apparatus 12 as a response to the second command received in S39. The HTTP request includes the device ID which is accompanied with the second command and the received status information of the printer 14 after the modification in S52. The HTTP request that includes status information is an example of the second response. The process of S62 for transmitting an HTTP request including status information is an example of the second responding means or step and the second response process.

Including the status information in one of the HTTP requests transmitted periodically to the outside mediation apparatus 12 can reduce the number of communications between the inside mediation apparatus 13 and the outside mediation apparatus 12 compared to when the status information is transmitted in an HTTP request separate from the periodic HTTP requests. However, the second program 34 may include the modified status information in a separate HTTP request from the periodic HTTP requests and transmit this HTTP request to the outside mediation apparatus 12. In this case, the status information can be sent more quickly to the outside mediation apparatus 12 than when the status information is included in one of the periodically transmitted HTTP requests. In this case, the step S61 may be skipped, and the step S62 may be executed immediately after the step S60.

In S62 the first program 24 of the outside mediation apparatus 12 receives the modified status information as a response to the second command. After receiving the status information, in S63 the first program 24 overwrites a record having the device ID in the HTTP request received in S62 in the correlation database DB (see FIG. 2) so that settings information, firmware version, and the like are updated to values in the newly received status information. The process of S62 in which the outside mediation apparatus 12 receives status information is an example of the second response receiving means or step.

While not shown in the sequence diagram, after the first program 24 receives the HTTP request including status information in S62, the first program 24 transmits an HTTP response to this request to the inside mediation apparatus 13 indicating that the HTTP request was received.

In S64 the first program 24 of the outside mediation apparatus 12 generates setting completion information that includes the status information received in S62 and information indicating that the printer 14 executed the instruction specified by (the instruction information of) the first command and transmits this setting completion information to the management server 11 as a response to the first command received in S31. The setting completion information is information (for example, a command) that can be inputted into (or interpreted by) the management server 11 and includes the status information as accompanying information, for example. The setting completion information is an example of the first response. The process of S64 for generating setting completion information is an example of the first converting means or step. The process of S64 for transmitting the setting completion information is an example of the first responding means or step and the first response process.

The first program 24 of the outside mediation apparatus 12 may also transmit the status information received in S62 to the management server 11 separately from the setting completion information. In other words, information indicating that settings were performed and status information obtained after the settings were performed may be transmitted separately to the management server 11.

After receiving the setting completion information via the Internet 15 in S64, in S65 the management server 11 transmits a reception response to the outside mediation apparatus 12 indicating that the setting completion information was received. In S65 the first program 24 of the outside mediation apparatus 12 receives the reception response from the management server 11 and completes the process.

The process described above is executed by the first program 24 of the outside mediation apparatus 12 and the second program 34 of the inside mediation apparatus 13 in response to instructions (the first command) from the management server 11. Next, a process executed by the first program 24 of the outside mediation apparatus 12 and the second program 34 of the inside mediation apparatus 13 to acquire status information from the printer 14 periodically and independent of instructions from the management server 11 will be described with reference to FIG. 6. The process shown in FIG. 6 and the process shown in FIGS. 4 and 5 are performed in parallel. So, the process shown in FIGS. 5 and 6 and the process shown in FIG. 6 may be performed in parallel or at different timing. Further, a process in FIG. 6 may be repeatedly executed.

The second program 34 of the inside mediation apparatus 13 waits until a periodic status acquisition timing has arrived (S71: NO). The periodic status acquisition timing may be every hour, every 12 hours, or every 24 hours, for example. In other words, the periodic status acquisition timing is set to a longer interval than the transmission timing for periodically transmitting HTTP requests. A longer interval is set for the periodic status acquisition timing because the printer 14 consumes power when returning (transmitting) status information. Consequently, the battery 50 would be depleted at a faster rate if the periodic status acquisition timing were set to units of seconds or minutes. Setting the periodic status acquisition timing to hourly units such as every hour, every 12 hours, or 24 hours can reduce depletion of the battery 50. The periodic status acquisition timing is an example of the second prescribed interval.

Although not illustrated in FIG. 1, the printer 14 has a power supply circuit for driving the printing engine 51 and charging the battery 50. The power supply circuit converts an inputted commercial AC voltage to DC voltage and outputs the DC voltage. The control program 44 of the printer 14 has a function for executing a sleep process, i.e., to halt driving of the power supply circuit. Setting the periodic status acquisition timing to hourly units such as intervals of 1, 12, or 24 hours can reduce the frequency at which the printer 14 placed in a sleep state by the sleep function is awakened to a drive state in which the drive circuit outputs DC voltage. This approach suppresses depletion of the battery 50, as well as unpleasantness to the user of the printer 14. "Unpleasantness to the user of the printer 14" denotes an inconvenience felt when the printer 14 is immediately awakened to its drive state after being placed in a sleep state.

When the second program 34 of the inside mediation apparatus 13 determines that the periodic status acquisition timing has arrived (S71: YES), in S72 the second program 34 transmits a command to the printer 14 requesting the printer 14 to return (transmit) status information. The process of S72 for transmitting a command requesting status information to the printer 14 is an example of the status requesting means or step. The command transmitted in S72 is an example of the status request.

In S72 the control program 44 of the printer 14 receives the command from the inside mediation apparatus 13. In S73 the control program 44 returns (transmits) the status information as a response to the command.

In S73 the second program 34 of the inside mediation apparatus 13 receives the status information from the printer 14. Note that the second program 34 may not receive status information from the printer 14 if the power to the printer 14 is off or if the printer 14 has been taken out of the branch office and is no longer connected to the local area network 16, for example. While not shown in the sequence diagram, the second program 34 generates third error information indicating that status information was not received in a case where status information is not received or where communications with the printer 14 cannot be established. The process of S73 in which the inside mediation apparatus 13 receives status information is an example of the status receiving means or step.

In S74 the second program 34 of the inside mediation apparatus 13 determines whether a transmission timing for transmitting an HTTP request to the outside mediation apparatus 12 has arrived. If the second program 34 determines that the transmission timing has not arrived (S74: NO), the second program 34 returns to S72 to repeat the processes in S72 and S73. However, if the second program 34 determines that the transmission timing has arrived (S74: YES), in S75 the second program 34 determines whether status information was received in S73.

When determining that status information was not received (S75: NO), in S76 the second program 34 transmits an HTTP request including the third error information to the outside mediation apparatus 12. Note that the third error information may be included in a separate HTTP request from the periodically transmitted HTTP requests. That is, when status information was not received, the second program 34 may transmit an HTTP request that includes the third error information to the outside mediation apparatus 12 without waiting for the transmission timing to arrive. When the first program 24 receives an HTTP request that includes the third error information in S76, in S78 the first program 24 transmits a response to the inside mediation apparatus 13 indicating that the HTTP request was received.

After receiving the HTTP request including the third error information in S76, in S77 the first program 24 of the outside mediation apparatus 12 elects not to update the correlation database DB and not to transmit information corresponding to the third error information to the management server 11. In other words, the first program 24 generates the second error information and transmits this information to the management server 11 when the printer 14 did not execute the instruction specified by (the instruction information of) the first command inputted from the management server 11 (see FIG. 5), but does not transmit any error information such as the third error information to the management server 11 when unable to acquire status information for which periodic acquisition is attempted. In other words, third error information frequently generated due to the power of the printer 14 being off or the printer 14 being taken out of the branch office is not transmitted to the management server 11. Hence, this approach can prevent error information from being transmitted to the management server 11 frequently.

Rather than transmitting the third error information to the management server 11 indicating that status information could not be acquired, the first program 24 of the outside mediation apparatus 12 may record the latest date that the status information was received in the correlation database DB under the item "Modified Date" (see FIG. 2) and transmit the item "Modified Date" to the management server 11. This process will be described next in greater detail.

In a case where the second program 34 of the inside mediation apparatus 13 determines that status information was received (S75: YES), in S79 the second program 34 transmits an HTTP request that includes the status information received in S73 to the outside mediation apparatus 12. Note that the status information may be included in a separate HTTP request from the periodically transmitted HTTP requests. In other words, when the second program 34 determines that status information was received, the second program 34 may transmit an HTTP request including the status information to the outside mediation apparatus 12 without waiting for the transmission timing to arrive.

In S79 the first program 24 of the outside mediation apparatus 12 receives the HTTP request from the inside mediation apparatus 13. In response to receiving the HTTP request including status information in S79, in S80 the first program 24 transmits an HTTP response to the inside mediation apparatus 13 indicating that the HTTP request was received.

After receiving an HTTP request including status information in S79, in S81 the first program 24 updates the items in the correlation database DB based on the newly received status information. The first program 24 also updates the date stored in the item "Modified Date" to the date on which the HTTP request including the status information was received as a latest date on which the status information was updated and the latest date on which communication with the printer 14 was performed. By displaying the correlation database DB on the display of the outside mediation apparatus 12, the administrator of the outside mediation apparatus 12 can confirm the item "Modified Date" and can see the latest date on which the status information was updated and the latest date on which communication with the printer 14 was performed. Note that while this example describes updating the item "Modified Date" to the date at which the first program 24 received the HTTP request including the status information, the item "Modified Date" may be updated to the date at which the second program 34 of the inside mediation apparatus 13 received status information from the printer 14 in S73. In this case, the HTTP request that the inside mediation apparatus 13 transmits in S79 will include the date that the inside mediation apparatus 13 received the status information in addition to the status information. In this case, the correlation database DB may include the item "Modified Date and Time" to indicate the date and time as described above instead of the item "Modified Date". In this case, in S81 the first program 24 updates the date and time stored in the "Modified Date and Time" to the date and time at which the HTTP request including the status information was received as a latest date and time at which the status information was updated. Alternatively, the item "Modified Date and Time" may be updated to the date and time at which the second program 34 of the inside mediation apparatus 13 received status information from the printer 14 in S73. In this case, the HTTP request transmitted in S79 may include the date and time that the inside mediation apparatus 13 received the status information in addition to the status information.

In S82 the first program 24 of the outside mediation apparatus 12 transmits to the management server 11 a command having the updated status information and the updated date as accompanying information.

After receiving the command with this accompanying information in S82, the management server 11 stores the updated status information and date in the memory (not shown), and in S83 transmits a response to the outside mediation apparatus 12 indicating that the status information and the modified date were received. Therefore, the administrator can confirm the latest date that status information was received by using a browser to display information stored on the management server 11 on the display of the outside mediation apparatus 12 or by displaying the correlation database DB stored in the memory 22 of the outside mediation apparatus 12 on the display. By confirming the latest date on which status information was received, the administrator can recognize that communications with the printer 14 were not performed from the latest date to the present time, and thus can estimate that the communications may not be possible from the latest date to the present time. In other words, the outside mediation apparatus 12 transmits the modified date to the management server 11 in place of third error information specifying that communications with the printer 14 were not possible and by recording this modified date in the correlation database DB, the outside mediation apparatus 12 can provide the administrator with the same content as that specified in the third error information.

Next, a process executed by the first program 24 of the outside mediation apparatus 12 for excluding a printer 14 from printers under management will be described with reference to FIG. 7(A).

In S91 the first program 24 of the outside mediation apparatus 12 determines whether a delete command was inputted from the administrator and repeatedly performs the determination while a delete command was not inputted (S91: NO). The administrator specifies a device ID when inputting a delete command. If a delete command was inputted (S91: YES), in S92 the first program 24 deletes the record having the same device ID specified in the delete command from the correlation database DB (see FIG. 2). In S93 the first program 24 generates a delete command to transmit to the management server 11. The delete command is a command that can be inputted into (or interpreted by) the management server 11 and includes the device ID specifying the printer 14 to be deleted as accompanying information. In S94 the first program 24 transmits this delete command to the management server 11.

In S94 the management server 11 receives the delete command from the outside mediation apparatus 12. In S95 the management server 11 deletes the device ID matching the device ID included in the delete command from the memory of the management server 11, and also deletes data associated with the device ID. In S96 the management server 11 transmits a response to the outside mediation apparatus 12 indicating that the device ID included in the delete command was deleted from the memory of the management server 11, thereby completing the process.

In S96 the first program 24 of the outside mediation apparatus 12 receives the response from the management server 11 and subsequently ends the process.

Effects of the Embodiment

In the embodiment, an instruction from the management server 11 is inputted into (or interpreted by) the printer 14 by the first program 24 of the outside mediation apparatus 12 and the second program 34 of the inside mediation apparatus 13. Accordingly, the management server 11 is capable of managing printers 14 that do not have a function for connecting to the Internet 15. That is, the MDM system can be used to manage printers 14 not possessing a function to connect to the Internet 15.

In the embodiment described above, the setting completion information transmitted to the management server 11 in S64 includes not only information specifying that the printer 14 executed the instruction from the management server 11, but also status information on the printer 14 following execution of the instruction. Accordingly, the management server 11 can even manage the status information of the printer 14 after the printer 14 has executed the instruction from the management server 11.

In the embodiment described above, the second program 34 of the inside mediation apparatus 13 transmits an HTTP request that includes a reception notification to the outside mediation apparatus 12 (S41) prior to transmitting a response corresponding to the second command (S55, S62). Accordingly, the outside mediation apparatus 12 is prevented from re-sending the second command despite the inside mediation apparatus 13 having already received the second command.

In the embodiment, the first program 24 of the outside mediation apparatus 12 and the second program 34 of the inside mediation apparatus 13 periodically acquire status information from the printer 14, record the periodically acquired status information in the correlation database DB, and transmit the periodically acquired status information to the management server 11 independent of instructions received from the management server 11. Hence, an MDM system can be used to manage the status of the printer 14 in addition to managing setting modifications on the printer 14.

In the embodiment, when the first command transmitted by the management server 11 is for an instruction requesting the printer 14 to return (transmit) status information, the outside mediation apparatus 12 transmits the status information on the printer 14 to the management server 11 as a response to the first command. The status information requested in the first command may differ from the status information periodically acquired by the first program 24 of the outside mediation apparatus 12 and the second program 34 of the inside mediation apparatus 13. In other words, by transmitting the first command, the management server 11 can acquire status information other than the periodically acquired status information. Status information other than the periodically acquired status information may be communication settings including port information for the printer 14, for example. Alternatively, the status information requested in the first command may include a part of status and settings included in the periodically acquired status information. Accordingly, status information requested during normal management can be acquired periodically and transmitted to the management server 11, and status information requested specially can also be transmitted to the management server 11, thereby broadening the scope in which the management server 11 manages the printers 14.

Since the second program 34 of the inside mediation apparatus 13 periodically transmits an HTTP request to the first program 24 of the outside mediation apparatus 12 in the embodiment, the first program 24 of the outside mediation apparatus 12 connected to the Internet 15 can transmit the second command via the firewall to the second program 34 of the inside mediation apparatus 13 connected to the local area network 16, thereby controlling the printer 14 to execute instructions from the management server 11.

In the embodiment, the status acquisition timing at which status information is acquired is set to a longer interval than that set for the transmission timing for transmitting HTTP requests. This approach can suppress the load on the printer 14, e.g., can suppress depletion of the battery 50.

In the embodiment, the inside mediation apparatus 13 includes the status information in one of the HTTP requests that is transmitted periodically (S62), thereby requiring fewer communications between the inside mediation apparatus 13 and the outside mediation apparatus 12 than when transmitting the status information separately from the periodically transmitted HTTP requests.

In the embodiment, the outside mediation apparatus 12 transmits the second error information to the management server 11 indicating that the printer 14 did not execute the instruction in the first command (S57), but does not transmit the third error information to the management server 11 indicating that status information could not be acquired when periodic attempts to acquire the status information are made (S77). In other words, the outside mediation apparatus 12 does not transmit the third error information frequently generated due to the power to the printer 14 being off or the printer 14 being taken out of the branch office, thereby avoiding the frequent transmission of error information to the management server 11.

In the embodiment, the second program 34 of the inside mediation apparatus 13 searches for printers 14 connected to the local area network 16 through the broadcast and acquires the device IDs of the printers 14 discovered in this search (S12). The second program 34 transmits the acquired device IDs to the outside mediation apparatus 12, and the outside mediation apparatus 12 records the device IDs in the correlation database DB stored in the memory 22. This process can save the administrator the trouble of having to register device IDs in the correlation database DB.

In the embodiment, the operator of the inside mediation apparatus 13 and the administrator of the outside mediation apparatus 12 both confirm whether printers 14 discovered in the search are printers to be managed on the management system 10 (S13, S16). Therefore, when a printer is not meant to be managed on the management system 10, this process prevents the printer from being inadvertently registered in the correlation database DB and subjected to management.

In the embodiment, the second program 34 of the inside mediation apparatus 13 generates the third command that can be inputted into (or interpreted by) the printer 14. Therefore, the first program 24 can be used universally for all printers 14. To explain this in greater detail, if the printers 14 used at Company A have different specifications from the printers 14 used at Company B, the type of command that can be inputted into (or interpreted by) the printers 14 will differ. However, since the second program 34 of the inside mediation apparatus 13 provided at each company generates the third command to be inputted into (or interpreted by) the corresponding printers 14, the first program 24 can be incorporated in both the management system 10 used by Company A and the management system 10 used by Company B.

First Variation

The embodiment describes an example in which the second program 34 of the inside mediation apparatus 13 generates the third command capable of being inputted into (or interpreted by) the printer 14. The first variation will describe an example in which the first program 24 of the outside mediation apparatus 12 generates a third command capable of being inputted into (or interpreted by) the printer 14.

In the first variation, the data storage area 29 in the memory 22 of the outside mediation apparatus 12 stores a third command list in addition to the first command list described above. The third command list specifies correlations between first commands and third commands. When in S31 of FIG. 4 the first program 24 of the outside mediation apparatus 12 receives a first command from the management server 11, in S34 the first program 24 generates a second command. Next, the first program 24 references the third command list to find the third command associated with the first command received in S31. The first program 24 accompanies the second command with the third command extracted from the third command list and the device ID of the printer 14 as accompanying information and in S39 transmits this second command to the inside mediation apparatus 13. Here, the second command in this variation is for instructing the second program 34 to extract the third command from the accompanied information when generating the third command in S42. The process of S34 for generating a second command with a third command and device ID as accompanying information is an example of the first generating means or step. The third command is an example of the device command. The third command list is an example of the command list.

In response to receiving the second command, in SM the second program 34 of the inside mediation apparatus 13 transmits the third command attached to the second command to the printer 14 having the device ID attached to the second command.

Effects of the First Variation

Since the first program 24 in the first variation generates the third commands inputted into (or interpreted by) the printers 14, the second program 34 can be used universally for all printers 14 regardless of their specifications. In other words, the second program 34 can be used commonly for both the management system 10 used by Company A and the management system 10 used by Company B, even though the specifications of printers 14 used at Company A differ from the specifications for printers 14 used at Company B.

In the first variation, the first program 24 generates the third commands that are inputted into (or interpreted by) the printers 14. If the specifications of printers 14 are modified or if printers 14 with new specifications are added, the first program 24 can manage printers 14 with new specifications without requiring modifications to the plurality of second programs 34, in a case where that the first program 24 can generate third commands that can be inputted into (or interpreted by) the printers 14 having new specifications. In other words, the management server 11 can manage printers 14 with new specifications simply by updating or modifying the first program 24.

Second Variation

The embodiment describes an example in which in S64 the first program 24 of the outside mediation apparatus 12 generates the setting completion information that can be inputted into (or interpreted by) the management server 11. The second variation will describe an example in which the second program 34 of the inside mediation apparatus 13 generates the setting completion information that can be inputted into (or interpreted by) the management server 11. This example will be described with reference to FIG. 5.

After receiving status information from the printer 14 in S60, in S62 the second program 34 of the inside mediation apparatus 13 generates setting completion information that can be inputted into (or interpreted by) the management server 11 and transmits an HTTP request including this setting completion information to the outside mediation apparatus 12. The setting completion information is generated in the same manner described in the embodiment, for example. The process of S62 for generating setting completion information is an example of the second converting means or step.

In response to receiving this HTTP request including setting completion information in S62, in S64 the first program 24 of the outside mediation apparatus 12 transmits to the management server 11 the setting completion information included in the HTTP request.

Third Variation

In a third variation, the instruction transmitted to the printer 14 based on the first command received from the management server 11 is an instruction requesting the printer 14 to return (transmit) status information, and the first program 24 of the outside mediation apparatus 12 transmits status information, which is acquired periodically from the printer 14, to the management server 11 as a response to the first command. An example of the third variation will be described with reference to FIGS. 4 and 6. Note that steps identical to those described in the embodiment will be omitted in the following description.

In response to receiving a second command having instruction information requesting the return of status information of the printer 14 (S39 in FIG. 4), in S41 the second program 34 of the inside mediation apparatus 13 transmits an HTTP request to the outside mediation apparatus 12 that includes a notification indicating that the second command was received. In a case where the received second command is for instructing to return (transmit) status information, the step shifts to S71 after the step S41 instead of shifting to the step S42. The second program 34 waits until the periodic status acquisition timing has arrived (S71: NO in FIG. 6).

When the second program 34 determines that the periodic status acquisition timing has arrived (S71: YES), in S72 the second program 34 transmits to the printer 14 a command requesting the return of status information and in S73 receives the status information from the printer 14. In S79 the first program 24 transmits an HTTP request including this status information to the outside mediation apparatus 12 as a response to the second command.

After receiving this HTTP request including status information in S80, in S81 the first program 24 of the outside mediation apparatus 12 updates the correlation database DB according to the newly received status information and in S82 transmits the status information to the management server 11 as a response to the first command.

In S82 the management server 11 receives the status information as a response to the first command transmitted by the management server 11 and in S83 transmits a response to the outside mediation apparatus 12 via the Internet 15 indicating that the status information was received.

In S83 the first program 24 of the outside mediation apparatus 12 receives a response indicating that the status information was received, and the process ends.

Fourth Variation

The embodiment describes an example in which the second program 34 of the inside mediation apparatus 13 transmits status information periodically acquired from the printer 14 to the outside mediation apparatus 12. In the fourth variation, the second program 34 stores status information periodically acquired from the printer 14 in the memory 32 and transmits the status information stored in the memory 32 to the outside mediation apparatus 12 as a response to the second command. An example of the fourth variation will be described with reference to FIGS. 4-6.

In response to receiving status information from the printer 14 (S73 in FIG. 6), the second program 34 of the inside mediation apparatus 13 stores this status information in the memory 32. After the step S73, the process shown in FIG. 6 shifts to S74 and S75. If YES determination is made in S75, the process returns to S71 instead of shifting to S79. Further, after S78, the process mar return to S71. On the other hand, the process shown in FIG. 4 begins separately from the process shown in FIG. 6, and in S31 the management server 11 transmits the first command requesting the return of the status information. The steps S32-S38 are executed similarly to the embodiment. In response to receiving a second command requesting the return of status information from the outside mediation apparatus 12 in S39, the process shifts to S62 in FIG. 5, and in S62 the second program 34 reads the status information from the memory 32 and transmits the status information to the outside mediation apparatus 12 as a response to the second command. The first program 24 of the outside mediation apparatus 12 receives the status information from the inside mediation apparatus 13 in S62, and in S64 transmits this newly received status information to the management server 11 as a response to the first command. The process of S73 for receiving status information from the printer 14 is an example of the status receiving means or step. The process for storing the received status information in the memory 32 is an example of the second storing means or step.

Effects of the Fourth Variation

When the management server 11 transmits the first command to the outside mediation apparatus 12 requesting the status information, in the fourth variation status information stored in the memory 32 of the inside mediation apparatus 13 is returned (transmitted) to the management server 11 as a response to this first command. Accordingly, recent status information can be returned to the management server 11 even when the power to the printer 14 is off or the printer 14 has been taken out of the branch office.

Fifth Variation

In a fifth variation, a third program 30 is installed on the inside mediation apparatus 13 in addition to the second program 34. An example of the fifth variation will be described with reference to FIG. 7(B).

The third program 30 is used to manage newly added printers 14. In other words, when printers 14 having different specifications from printers 14 currently under management are newly added to a local area network 16, the third program 30 can be used to manage the new printers 14 without requiring operations of the second program 34 to be halted in order to update the second program 34. Here, a printer 14 having different specifications indicates that the type of command inputted into (or interpreted by) the printer 14 differs from the type of command inputted to (or interpreted by) a printer 14 currently under management. In the embodiment described above, the second program 34 generates the third commands that are inputted into (or interpreted by) the printers 14. Hence, if a printer 14 with different specifications is newly added to the local area network 16, operations of the second program 34 must be halted for performing an updating process to add commands that can be inputted into (or interpreted by) the new printer 14 to the second command list. In the fifth variation, newly added printers 14 having different specifications can be managed without halting operations of the second program 34 to update the same. In the following description, steps identical to those in the embodiment will be assigned with the same step numbers to avoid duplicating description.

When the second program 34 of the inside mediation apparatus 13 receives a second command from the first program 24 of the outside mediation apparatus 12 in S39, in S121 the second program 34 determines whether it is possible to generate a third command that can be inputted into (or interpreted by) the printer 14 specified by the device ID that is attached to this second command. If the second program 34 determines that the third command can be generated (S121: YES), in S42 the second program 34 generates the third command as described in the embodiment and in S51 transmits this third command to the printer 14. In this case, the process may proceeds to the step S52 shown in FIG. 5.

However, if the second program 34 determines that the third command cannot be generated (S121: NO), in S122 the second program 34 instructs the third program 30 to generate the third command. In response to receiving the instruction in S122, in S123 the third program 30 generates the third command. More specifically, the third program 30 uses a fourth command list to generate the third command. The fourth command list is stored in the data storage area 39 of the memory 32 separate from the second command list with which the second program 34 generates the third command. The fourth command list specifies correlations among second commands, third commands to be inputted to (or interpreted by) the newly added printer 14, and the device ID of the newly added printer 14. The third program 30 generates the third command by referencing the fourth command list and extracting the third command that is associated with the second command and device ID included in the instruction to generate the third command. The third program 30 transfers this third command to the second program 34. Note that the instruction to generate a third command in S122 and the transfer of the third command in S124 are both performed via the OS 33 of the inside mediation apparatus 13.

In SM the second program 34 transmits the third command received from the third program 30 to the printer 14.

Note that the second program 34 may also be updated during times of periodic maintenance or holidays in order to be able to generate third commands that can be inputted into (or interpreted by) newly added printers 14.

Effects of the Fifth Variation

In the fifth variation, the management server 11 can manage newly added printers 14 with different specifications without having to halt operations of the second program 34, i.e., without halting management of the printers 14.

Sixth Variation

In a sixth variation, an example for temporarily adding a type of status information that the inside mediation apparatus 13 acquires periodically will be described with reference to FIG. 8. Note that steps in this process that are identical to those in the embodiment are designated with the same step numbers to avoid duplicating description.

Figure 8:
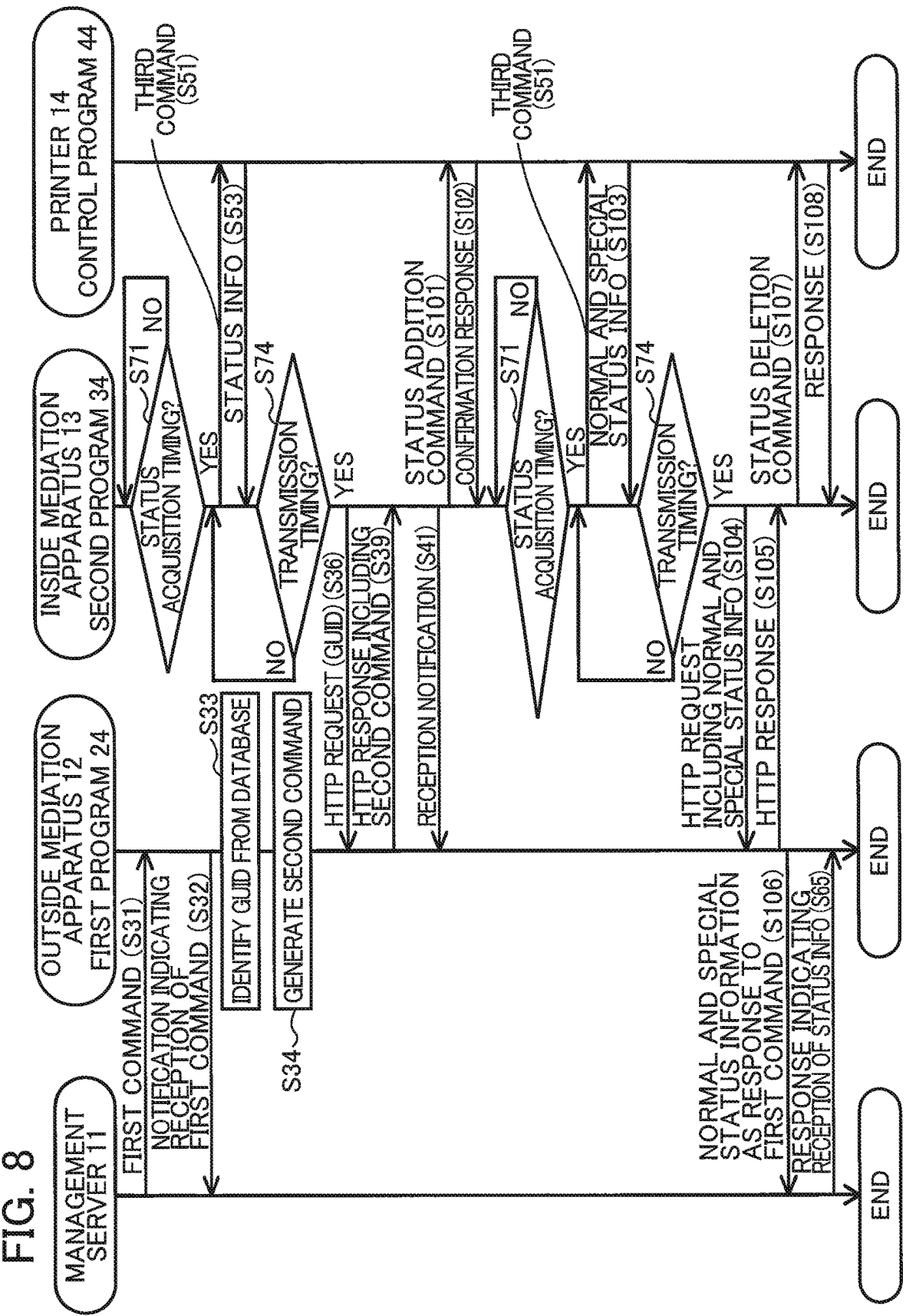
FIG. 8 is a sequence diagram illustrating a process executed by the management server, the outside mediation apparatus, the inside mediation apparatus, and the printer for acquiring status information from the printer explained in a sixth variation.

In S31 of FIG. 8 the first program 24 of the outside mediation apparatus 12 receives the first command from the management server 11. The first command includes the instruction information for requesting, in addition to normal status information that the second program 34 of the inside mediation apparatus 13 periodically acquires from the printer 14, special status information not included in the normal status information. When the first program 24 receives the first command in S31, the first program 24 executes steps S32-S39 as described in the embodiment.

In the meantime, the second program 34 of the inside mediation apparatus 13 executes the processes in S39 and S41 as described in the embodiment. Further, when the second program 34 determines that the second command received in S39 is a command for requesting normal status information and special status information, in S101 the second program 34 generates a status addition command and a third command and transmits the status addition command to the printer 14. The status addition command is for instructing the printer 14 to modify a setting so that the printer 14 returns (transmits) both normal status information and special status information. The third command is the same command described in the embodiment for requesting the return of status information. As with the third command, the status addition command is generated based on the command list stored in the memory 32.

While not shown in the sequence diagram, after executing the process of S39, the outside mediation apparatus 12 may also transmit to the inside mediation apparatus 13 a command instructing the inside mediation apparatus 13 to shorten the interval of the transmission timing (see S74) for transmitting HTTP requests, as an HTTP response to an HTTP request received from the inside mediation apparatus 13 (for example one of HTTP requests periodically transmitted). After receiving this command, the second program 34 of the inside mediation apparatus 13 may shorten the transmission interval for transmitting HTTP requests to the outside mediation apparatus 12 to the interval specified in the command.

In S101 the control program 44 of the printer 14 receives the status addition command from the inside mediation apparatus 13. In response to receiving this status addition command, the printer 14 modifies the setting in the printer 14 to return (transmit) both normal status information and special status information in accordance with the status addition command and in S102 transmits a confirmation response to the inside mediation apparatus 13 indicating that the modification was made.

After receiving the confirmation response from the printer 14, in S71 the second program 34 of the inside mediation apparatus 13 determines whether the periodic status acquisition timing has arrived. When the second program 34 determines that the periodic status acquisition timing has arrived (S71: YES), in S51 the second program 34 transmits the third command to the printer 14.

In S51 the control program 44 of the printer 14 receives the third command from the inside mediation apparatus 13. In S103 the control program 44 transmits the normal status information and the special status information to the inside mediation apparatus 13 as a response to the third command.

After receiving the normal status information and the special status information from the printer 14, in S74 the second program 34 of the inside mediation apparatus 13 determines whether the periodic transmission timing has arrived. If the periodic transmission timing has arrived (S74: YES), in S104 the second program 34 transmits an HTTP request that includes the normal status information and the special status information to the outside mediation apparatus 12. The second program 34 may also include the normal status information and the special status information in a separate HTTP request from the HTTP requests periodically transmitted and may transmit this HTTP request to the outside mediation apparatus 12 after receiving the normal status information and special status information in S103, without waiting for the transmission timing to arrive.

In S104 the first program 24 of the outside mediation apparatus 12 receives the normal status information and the special status information from the inside mediation apparatus 13. In S105 the first program 24 transmits an HTTP response to the inside mediation apparatus 13 indicating that the normal status information and the special status information were received. In S106 the first program 24 transmits the normal status information and the special status information to the management server 11 as a response to the first command received in S31.

In S106 the management server 11 receives the normal status information and the special status information from the outside mediation apparatus 12 via the Internet 15. In response to receiving the normal status information and the special status information, in S65 the management server 11 transmits a response to the outside mediation apparatus 12 via the Internet 15 indicating that the normal status information and the special status information were received.

In S105 the second program 34 of the inside mediation apparatus 13 receives the HTTP response from the outside mediation apparatus 12 indicating that the normal status information and the special status information were received. In response to the HTTP response, in S107 the second program 34 generates a status deletion command and transmits this command to the printer 14. The status deletion command is a command for instructing to modify the setting of the printer 14 so that the printer 14 does not return (transmit) the special status information. Note that, as with the status addition command, the status deletion command is generated based on the command list stored in the memory 32. When returning (transmitting) the HTTP response indicating that the normal status information and the special status information were received or returning (transmitting) the HTTP response to the HTTP request received periodically, the first program 24 of the outside mediation apparatus 12 may generate a command instructing the second program 34 to generate the status deletion command and to input this command into the printer 14, may include this command in the HTTP response, and may transmit this HTTP response to the inside mediation apparatus 13.

While not shown in the sequence diagram, after in S105 the second program 34 of the inside mediation apparatus 13 receives from the outside mediation apparatus 12 the HTTP response indicating that the outside mediation apparatus 12 received the normal status information and the special status information, the second program 34 executes a process to reset the shortened transmission interval for HTTP requests to the original transmission interval. Alternatively, when returning (transmitting) the HTTP response indicating that the normal status information and the special status information were received or returning (transmitting) the HTTP response to the HTTP request received periodically, the first program 24 of the outside mediation apparatus 12 may also generate a command in the HTTP response instructing the second program 34 to set the shortened transmission interval for HTTP requests to the original transmission interval, may include this command in the HTTP response, and may transmit this HTTP response to the inside mediation apparatus 13.

In S107 the control program 44 of the printer 14 receives the status deletion command from the inside mediation apparatus 13. The control program 44 modifies the setting of the printer 14 to return (transmit) only the normal status in accordance with the status deletion command and in S108 transmits a response to the inside mediation apparatus 13 indicating that the setting was modified.

In S108 the second program 34 of the inside mediation apparatus 13 receives the response from the printer 14, and the process ends.

Effects of the Sixth Variation

In the sixth variation, the special status information can be acquired from the printer 14 and returned (transmitted) to the management server 11 in response to the instruction received from the management server 11. In addition, the periodic status information can be transmitted at a shorter interval than normal.

Further, the status deletion command can be used to shift the printer 14 to its original state of returning only its normal status, thereby preventing the printer 14 from continuing to return both its normal status information and special status information. Performing this process can avoid imposing an excessive load on the printer 14, which can deplete the battery 50, for example.

Seventh Variation

In the third variation described above, the status information of the printer 14 is transmitted to the management server 11 in response to the instruction from the management server 11. In this case, the next periodically acquired status information after the instruction is received from the management server 11 is acquired and transmitted to the management server 11. However, receiving the next periodic status information may take time in some cases. In the seventh variation, status information can be acquired more rapidly than in the embodiment and variations described above. An example of the seventh variation will be described with reference to FIG. 9.

Figure 9:
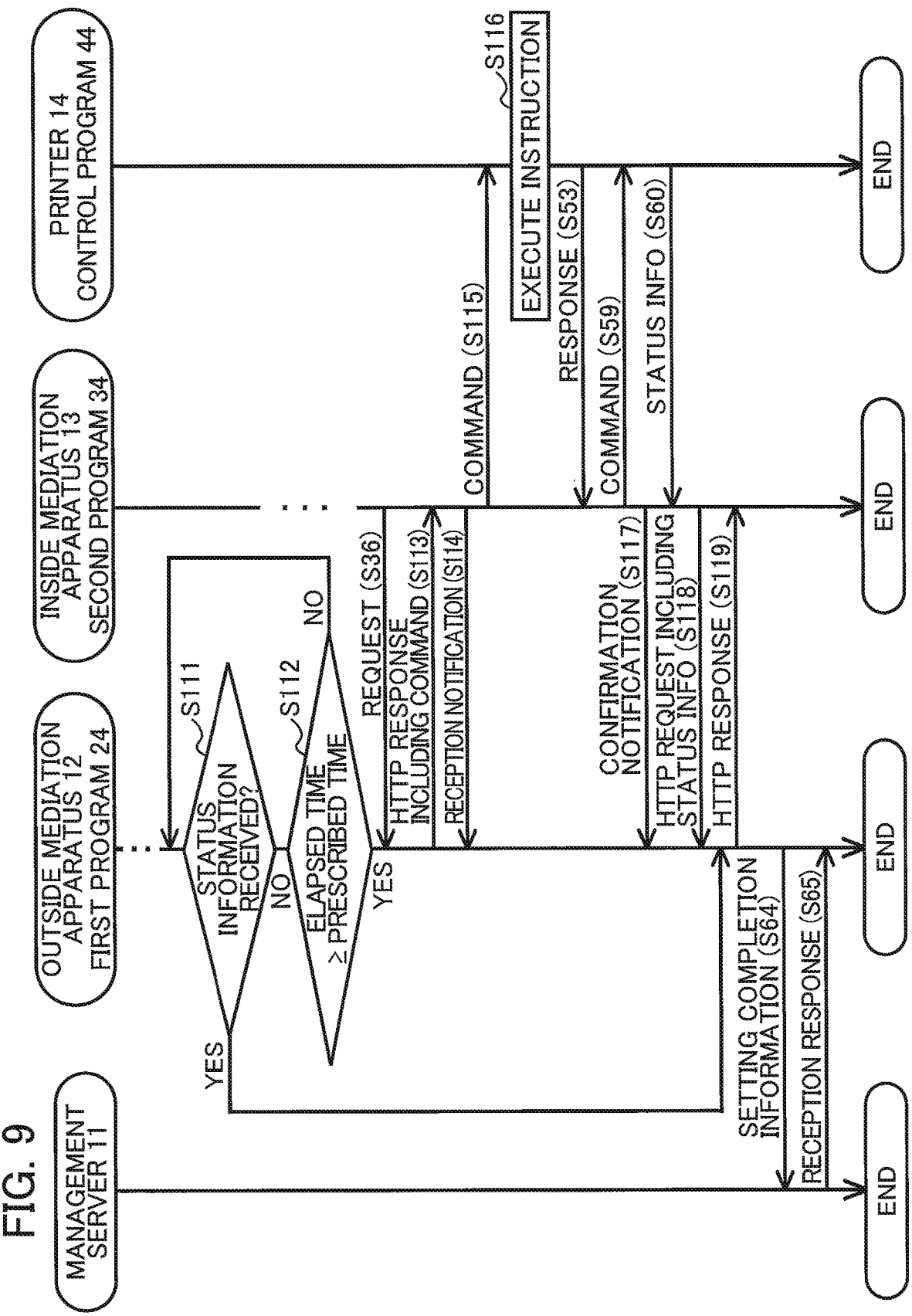
FIG. 9 is a sequence diagram illustrating a process executed by the management server, the outside mediation apparatus, the inside mediation apparatus, and the printer for acquiring status information from the printer explained in a seventh variation.

The sequence diagram in FIG. 9 shows steps following S41 in the embodiment and the sixth variation. Steps that are identical to those in the embodiment are designated with the same step numbers to avoid duplicating description.

As in the embodiment, the first program 24 of the outside mediation apparatus 12 and the second program 34 of the inside mediation apparatus 13 execute the process from S31 to S41. In S111 the first program 24 of the outside mediation apparatus 12 determines whether status information was acquired from the inside mediation apparatus 13. If the first program 24 determines that status information was acquired (S111: YES) in S119 the first program 24 transmits an HTTP response to the inside mediation apparatus 13 indicating that the status information was received, as in S80 of the embodiment and S105 of the sixth variation.

However, if the first program 24 determines that status information was not received (S111: NO), in S112 the first program 24 determines whether the time interval that has elapsed since the reception notification was received in S41 is greater than or equal to a prescribed time interval stored in the memory 22. The step S112 may be omitted. In other words, the first program 24 determines whether the status information was acquired within the prescribed time interval. If the elapsed time is less than the prescribed time interval (S112: NO), in S111 the first program 24 continues monitoring the reception of status information.

If the first program 24 determines that the elapsed time interval is greater than or equal to the prescribed time interval (S112: YES), the first program 24 waits to receive a periodic HTTP request from the inside mediation apparatus 13. When the HTTP request is received in S36, in S113 the first program 24 transmits an HTTP response including a command to the inside mediation apparatus 13. The command is a predetermined command that is not associated with the first command More specifically, the command instructs a setting modification that in essence does not modify any settings on the printer 14, for example. In other words, by transmitting a command that essentially does not modify any setting on the printer 14, the first program 24 of the outside mediation apparatus 12 enables the second program 34 of the inside mediation apparatus 13 to acquire status information from the printer 14 without modifying any settings for the printer 14.

More specifically, after the second program 34 of the inside mediation apparatus 13 receives the HTTP response including the command in S113, in S114 the second program 34 transmits a reception notification to the outside mediation apparatus 12 indicating that the command was received. In S115 the second program 34 transmits a command corresponding to the command received in S113 to the printer 14.

In response to receiving the command in S115, in S116 the control program 44 of the printer 14 formally modifies the setting in accordance with the command. As described above, the control program 44 essentially does not modify any setting for the printer 14 in S116. After completing the process in S116, in S53 the control program 44 transmits a response to the inside mediation apparatus 13 indicating that the setting was modified.

After receiving this response in S53, in S59 the second program 34 of the inside mediation apparatus 13 transmits a command to the printer 14 requesting the return of status information, as in the embodiment. Here, transmitting a command to the printer 14 requesting status information after a command to modify a setting is a predetermined routine of the second program 34. As described above, in S113 the first program 24 of the outside mediation apparatus 12 transmits the command to the second program 34 of the inside mediation apparatus 13 for modifying a setting that in essence does not modify any setting of the printer 14 for the purpose of allowing or prompting the second program 34 to acquire status information from the printer 14.

In S60 the second program 34 of the inside mediation apparatus 13 receives the status information from the printer 14. In the meantime, after transmitting the command to the printer 14 in S59, in S117 the second program 34 transmits a confirmation notification to the outside mediation apparatus 12 indicating that the printer 14 executed the process of S116.

After receiving status information in S60, in S118 the second program 34 transmits an HTTP request including this status information to the outside mediation apparatus 12. Note that the HTTP request including status information may be an HTTP request that the second program 34 transmits periodically to the outside mediation apparatus 12 or an HTTP request that is separate from the periodically transmitted HTTP requests.

After receiving the status information, in S119 the first program 24 of the outside mediation apparatus 12 transmits an HTTP response to the inside mediation apparatus 13 indicating that the status information was received. While not shown in the sequence diagram, the first program 24 executes the process of S63 as described in the embodiment (see FIG. 5) after performing the process in S119, and subsequently executes the processes in S64 and S65.

Effects of the Seventh Variation

In the seventh variation, status information on the printer 14 can be transmitted to the management server 11 more quickly than in the embodiment.

Other Variations

In the embodiment, the date on which the status information was acquired is recorded under the item "Modified Date" in the correlation database DB. However, the modified date may be added to a correlation database DB and also stored in the memory 32 of the inside mediation apparatus 13. The operator of the inside mediation apparatus 13 can then confirm an interval of no communications with the printer 14 by displaying the modified date stored in the memory 32 on the display of the inside mediation apparatus 13.

Alternatively, the correlation database DB may be stored in the memory 32 of the inside mediation apparatus 13 in addition to the memory 22 of the outside mediation apparatus 12. When the correlation database DB is updated, the first program 24 of the outside mediation apparatus 12 transmits an HTTP response to the inside mediation apparatus 13 that includes the updated correlation database DB. The second program 34 of the inside mediation apparatus 13 stores the correlation database DB received from the outside mediation apparatus 12 in the memory 32. Thus, the operator of the inside mediation apparatus 13 can confirm the settings, firmware version, and the like of printers 14 by displaying the correlation database DB stored in the memory 32 on the display of the inside mediation apparatus 13.

The embodiment describes an example in which the second command is transmitted from the outside mediation apparatus 12 to the inside mediation apparatus 13 via the firewall by the inside mediation apparatus 13 transmitting an HTTP request and the outside mediation apparatus 12 returning (transmitting) an HTTP response. However, another communication protocol may be used provided that the second command can be transmitted from the outside mediation apparatus 12 to the inside mediation apparatus 13 via the firewall. For example, the outside mediation apparatus 12 and the inside mediation apparatus 13 may communicate with each other using a communication protocol conforming to XMPP Over BOSH. In this case, a session is established by the outside mediation apparatus 12 transmitting a session creation request according to XMPP Over BOSH to the inside mediation apparatus 13 and the inside mediation apparatus 13 returning (transmitting) a session creation response. During the established session, the outside mediation apparatus 12 can then transmit the second command to the inside mediation apparatus 13 via the firewall.

In the embodiment, the printers 14 are used as an example of devices being managed. However, the devices under management may be scanners, such as QR code (registered trademark) readers, bar code readers, or handheld scanners; portable sewing machines; and the like.

The processes or the steps described in one of the above embodiment and modifications may be combined with the processes or the steps in remaining one of the embodiment and the modifications.

What is claimed is:

1. A non-transitory computer readable storage medium storing a set of program instructions comprising first program instructions executed by a first mediation apparatus, and second program instructions executed by a second mediation apparatus, the first mediation apparatus including a memory, the first mediation apparatus being configured to communicate with a management server via an internet and communicate with the second mediation apparatus through firewall, the second mediation apparatus being configured to communicate with a device via a local network, wherein the first program instructions comprise:

storing in the memory a correlation database correlating a mediation apparatus ID for identifying the second mediation apparatus with a first device ID for identifying the device;

requesting via the internet the management server to register the first device ID which is correlated to the second mediation apparatus in the correlation database;

after the requesting, receiving via the internet a first command from the management server, the first command including a second device ID matching the first device ID and first instruction information for the device identified by the second device ID;

specifying the mediation apparatus ID correlated with the second device ID matching the first device ID in the correlation database;

transmitting a second command to the second mediation apparatus identified by the specified mediation apparatus ID through the firewall by using a series of procedures which is initiated by the identified second mediation apparatus and enables the second mediation apparatus to receive information from the first mediation apparatus through the firewall, the second command including a third device ID matching the second device ID and second instruction information based on the first instruction information in the second command; and transmitting a first response as a response to the first command to the management server via the internet, wherein the second program instructions comprise:

initiating the series of procedures;

receiving the second command through the firewall;

transmitting a third command to the device identified by the third device ID, the third command including third instruction information based on the second instruction information; and transmitting a second response as a response to the second command to the first mediation apparatus through the firewall, wherein the second program instructions further comprise transmitting, as a part of the series of procedures, a protocol request together with the mediation apparatus ID to the first mediation apparatus through the firewall, the protocol request conforming to a prescribed communication protocol, wherein the transmitting a second command includes transmitting a protocol response to the second mediation apparatus through the firewall, the protocol response being a response to the protocol request and including the second command, wherein the receiving a second command includes acquiring the second command from the protocol response.

2. The non-transitory computer readable storage medium according to claim 1, wherein the first instruction information includes a first setting value to which the device identified by the second device ID is to be set, and the second instruction information includes the first setting value, wherein the third instruction information is for instructing the device to make settings according to the first setting value, wherein the second program instructions further comprise transmitting a command for instructing to transmit a second setting value of the device after the settings are made according to the third instruction information in the third command, wherein each of the first response and the second response includes the second setting value currently set to the device after the device executes the third command.

3. The non-transitory computer readable storage medium according to claim 1, wherein the second program instructions further comprise:

after receiving the second command, transmitting a notification to the first mediation apparatus through the firewall, the notification indicating that the second command is received; and after transmitting the third command, receiving a device response, as a response to the third command, from the device identified by the third device ID via the local network, wherein the second response is transmitted to the first mediation apparatus through the firewall after the notification is transmitted to the first mediation apparatus and the device response is received from the device.

4. The non-transitory computer readable storage medium according to claim 1, wherein the second program instructions further comprise receiving, from the device via the local network, status information of the device identified by the first device ID which is correlated, in the database, with the mediation apparatus ID identifying the second mediation apparatus currently executing the second program instructions, the status information of the device indicating status of the device, wherein the first instruction information is for requesting status information of the device identified by the second device ID, wherein the second instruction information is for requesting status information of the device identified by the third device ID, wherein each of the first response and the second response includes a device ID matching the third device ID and the received status information of the device identified by the third device ID.

5. The non-transitory computer readable storage medium according to claim 4, wherein the third instruction information is for requesting status information of the device identified by the third device ID, wherein the second program instructions further comprise receiving the status information of the device identified by the third device ID from the device identified by the third device ID via the local network.

6. The non-transitory computer readable storage medium according to claim 4, wherein the second program instructions further comprise:

after receiving the second command, transmitting a notification to the first mediation apparatus through the firewall, the notification indicating that the second command is received; and after transmitting the third command, receiving a device response, as a response to the third command, from the device identified by the third device ID via the local network, wherein the second response is transmitted to the first mediation apparatus through the firewall after the notification is transmitted to the first mediation apparatus and the device response is received from the device.

7. The non-transitory computer readable storage medium according to claim 1, wherein the second program instructions further comprise:

transmitting via the local network a status request to the device identified by the first device ID correlated with the mediation apparatus ID in the correlation database, the status request being for requesting the status information of the device identified by the first device ID correlated with the mediation apparatus ID in the correlation database, the status information of the device indicating status of the device;

receiving the status information from the device via the local network;

storing the received status information in the memory; and transmitting, as a response to the second command, the status information stored in the memory to the first mediation apparatus through the firewall.

8. The non-transitory computer readable storage medium according to claim 1, wherein the transmitting a protocol request is repeated at a prescribed first time interval, wherein the second program instructions further comprise:

transmitting via the local network a status request to the device which is identified by the first device ID correlated with the mediation apparatus ID identifying the second mediation apparatus in the correlation database, the status request being for requesting the status information of the device identified by the first device ID correlated with the mediation apparatus ID identifying the second mediation apparatus in the correlation database;

receiving the status information from the device via the local network;

storing the received status information in the memory; and transmitting, as a response to the second command, the status information stored in the memory to the first mediation apparatus through the firewall, wherein the transmitting a status request is repeated at a prescribed second time interval which is longer than the prescribed first time interval.

9. The non-transitory computer readable storage medium according to claim 1, wherein the second program instructions are installed on a plurality of second mediation apparatus, each of the plurality of second mediation apparatuses being connected to a corresponding device in a corresponding local network, wherein the second program instructions further comprise, in a case where the second program instructions are installed on one of the plurality of second mediation apparatuses and the one of the plurality of second mediation apparatuses receives the second command, transmitting the third command to a device in a local network corresponding to the one of the plurality of second mediation apparatuses, wherein the correlation database correlates a mediation ID for identifying each of the plurality of second mediation apparatuses with a device ID in a local network corresponding to the each of the plurality of second mediation apparatuses.

10. The non-transitory computer readable storage medium according to claim 1, wherein the protocol request includes the second response.

11. The non-transitory computer readable storage medium according to claim 1, wherein the memory stores a command list which correlates the first command with a device command which the device is capable of interpreting, wherein the first program instructions further comprise generating the second command including the device command by referring to the command list based on the first command, wherein the first program instructions further comprise generating the first response by converting the second response so that the management server is capable of interpreting the first response.

12. The non-transitory computer readable storage medium according to claim 1, wherein the second mediation apparatus includes a second memory storing a command list which correlates the second command with a device command which the device is capable of interpreting, wherein the second program instructions further comprise:

generating the third command including the device command by referring to the command list based on the second command; and generating the second response so that the management server is capable of interpret the first response.

13. The non-transitory computer readable storage medium according to claim 1, wherein the second program instructions further comprise:

receiving from the device identified by the third device ID a success response indicating that the third command is executed in success; and in a case where the success response is not received from the device identified by the third device ID, transmitting, through the firewall to the first mediation apparatus, first error information including the third device ID identifying the device from which the success response is not received, wherein the first program instructions further comprise:

receiving the first error information from the second mediation apparatus through the firewall; and in a case where the receiving receives the first error information, transmitting second error information as the first response to the management server via the internet, the second error information includes the second device ID matching the third device ID and information indicating that the device identified by the second device ID does not execute an instruction based on the first command.

14. The non-transitory computer readable storage medium according to claim 4, wherein the second program instructions further comprise:

receiving from the device identified by the third device ID a success response indicating that the second command is executed in success;

in a case where the success response is not received from the device identified by the third device ID, transmitting, through the firewall to the first mediation apparatus, first error information which includes the third device ID identifying the device from which the success response is not received; and in a case where the status information is not received from the device, transmitting, through the firewall to the first mediation apparatus, second error information including device ID identifying the device and indicating that the status information is not received from the device, wherein the first program instructions further comprise:

receiving the first error information from the second mediation apparatus through the firewall; and in a case where the receiving receives the first error information, transmitting third error information including the second device ID matching the third device ID and information indicating that the device identified by the second device ID does not execute an instruction based on the first instruction information, wherein the first program instructions do not have any instruction for transmitting the second error information to the management server.

15. The non-transitory computer readable storage medium according to claim 1, wherein the second program instructions further comprise:

broadcasting, to devices in the local network, a broadcast request for requesting a response including a device ID identifying a device which receives the broadcast request;

receiving the response to the broadcast request from a device in the local network, the response including a device ID identifying the device transmitting the response; and transmitting, to the first mediation apparatus through the firewall, the mediation ID and the device ID which is included in the received response, wherein the first program instructions further comprise:
receiving, from the second mediation apparatus through the firewall, the mediation ID and the device ID;
registering in the correlation database a record including the received mediation ID and the received device ID to be correlated with waiting-state information indicating that management of a device identified by the received device ID is not started;
receiving a start instruction for instructing to replace the waiting-state information in the record correlated to the received device ID into managing-state information indicating that the device identified by the received device ID is under management; and
replacing the waiting-state information in the record correlated to the received device ID into the managing-state information according to the received start instruction,
wherein the requesting to register the first device ID is performed after the start instruction is received.

16. A communication system comprising a first mediation apparatus and a second mediation apparatus,
wherein the first mediation apparatus is configured to communicate with a management server via an internet and communicate with the second mediation apparatus through firewall, the second mediation apparatus being configured to communicate with a device via a local network,
wherein the first mediation apparatus includes a memory and a first control device configured to perform:
storing in the memory a correlation database correlating a mediation apparatus ID for identifying the second mediation apparatus with a first device ID for identifying the device;
requesting via the internet the management server to register the first device ID which is correlated to the second mediation apparatus in the correlation database;
after the requesting, receiving via the internet a first command from the management server, the first command including a second device ID matching the first device ID and first instruction information for the device identified by the second device ID;
specifying the mediation apparatus ID correlated with the second device ID matching the first device ID in the correlation database;
transmitting a second command to the second mediation apparatus identified by the specified mediation apparatus ID through the firewall by using a series of procedures which is initiated by the identified second mediation apparatus and enables the second mediation apparatus to receive information from the first mediation apparatus through the firewall, the second command including a third device ID matching the second device ID and second instruction information based on the first instruction information in the second command; and
transmitting a first response as a response to the first command to the management server via the internet,
wherein the second mediation apparatus includes a second control device configured to perform:
initiating the series of procedures;
receiving the second command through the firewall;
transmitting a third command to the device identified by the third device ID, the third command including third instruction information based on the second instruction information; and
transmitting a second response as a response to the second command to the first mediation apparatus through the firewall,
wherein the second control device is configured to further perform transmitting, as a part of the series of procedures, a protocol request together with the mediation apparatus ID to the first mediation apparatus through the firewall, the protocol request conforming to a prescribed communication protocol,
wherein the transmitting a second command includes transmitting a protocol response to the second mediation apparatus through the firewall, the protocol response being a response to the protocol request and including the second command,
wherein the receiving a second command includes acquiring the second command from the protocol response.

17. The communication system according to claim 16, wherein the first instruction information includes a first setting value to which the device identified by the second device ID is to be set, and the second instruction information includes the first setting value,
wherein the third instruction information is for instructing the device to make settings according to the first setting value,
wherein the second control device is configured to further perform transmitting a command for instructing to transmit a second setting value of the device after the settings are made according to the third instruction information in the third command,
wherein each of the first response and the second response includes the second setting value currently set to the device after the device executes the third command.

18. The communication system according to claim 16, wherein the second control device is configured to further perform:
after receiving the second command, transmitting a notification to the first mediation apparatus through the firewall, the notification indicating that the second command is received; and
after transmitting the third command, receiving a device response, as a response to the third command, from the device identified by the third device ID via the local network,
wherein the second response is transmitted to the first mediation apparatus through the firewall after the notification is transmitted to the first mediation apparatus and the device response is received from the device.

19. The communication system according to claim 16, wherein the second control device is configured to further perform receiving, from the device via the local network, status information of the device identified by the first device ID which is correlated, in the database, with the mediation apparatus ID identifying the second mediation apparatus, the status information of the device indicating status of the device,
wherein the first instruction information is for requesting status information of the device identified by the second device ID,
wherein the second instruction information is for requesting status information of the device identified by the third device ID,
wherein each of the first response and the second response includes a device ID matching the third device ID and the received status information of the device identified by the third device ID.

20. The communication system according to claim 19, wherein the third instruction information is for requesting status information of the device identified by the third device ID,
  wherein the second control device is configured to further perform receiving the status information of the device identified by the third device ID from the device identified by the third device ID via the local network.

21. The communication system according to claim 19, wherein the second control device is configured to further perform:
  after receiving the second command, transmitting a notification to the first mediation apparatus through the firewall, the notification indicating that the second command is received; and
  after transmitting the third command, receiving a device response, as a response to the third command, from the device identified by the third device ID via the local network,
  wherein the second response is transmitted to the first mediation apparatus through the firewall after the notification is transmitted to the first mediation apparatus and the device response is received from the device.

22. The communication system according to claim 16, wherein the second control device is configured to further perform:
  transmitting via the local network a status request to the device identified by the first device ID correlated with the mediation apparatus ID in the correlation database, the status request being for requesting the status information of the device identified by the first device ID correlated with the mediation apparatus ID in the correlation database, the status information of the device indicating status of the device;
  receiving the status information from the device via the local network;
  storing the received status information in the memory; and
  transmitting, as a response to the second command, the status information stored in the memory to the first mediation apparatus through the firewall.

23. The communication system according to claim 16, wherein the transmitting a protocol request is repeated at a prescribed first time interval,
  wherein the second control device is configured to further perform:
  transmitting via the local network a status request to the device which is identified by the first device ID correlated with the mediation apparatus ID identifying the second mediation apparatus in the correlation database, the status request being for requesting the status information of the device identified by the first device ID correlated with the mediation apparatus ID identifying the second mediation apparatus in the correlation database;
  receiving the status information from the device via the local network;
  storing the received status information in the memory; and
  transmitting, as a response to the second command, the status information stored in the memory to the first mediation apparatus through the firewall,
  wherein the transmitting a status request is repeated at a prescribed second time interval which is longer than the prescribed first time interval.

24. The communication system according to claim 16, further comprising a plurality of second mediation apparatus including the second mediation apparatus, each of the plurality of second mediation apparatuses being connected to a corresponding device in a corresponding local network,
  wherein the second control device is configured to further perform, in a case where one of the plurality of second mediation apparatuses receives the second command, transmitting the third command to a device in a local network corresponding to the one of the plurality of second mediation apparatuses,
  wherein the correlation database correlates a mediation ID for identifying each of the plurality of second mediation apparatuses with a device ID in a local network corresponding to the each of the plurality of second mediation apparatuses.

25. The communication system according to claim 16, wherein the protocol request includes the second response.

26. The communication system according to claim 16, wherein the memory stores a command list which correlates the first command with a device command which the device is capable of interpreting,
  wherein the first control device is configured to further perform generating the second command including the device command by referring to the command list based on the first command,
  wherein the first control device is configured to further perform generating the first response by converting the second response so that the management server is capable of interpreting the first response.

27. The communication system according to claim 16, wherein the second mediation apparatus includes a second memory storing a command list which correlates the second command with a device command which the device is capable of interpreting,
  wherein the second control device is configured to further perform:
  generating the third command including the device command by referring to the command list based on the second command; and
  generating the second response so that the management server is capable of interpret the first response.

28. The communication system according to claim 16, wherein the second control device is configured to further perform:
  receiving from the device identified by the third device ID a success response indicating that the third command is executed in success; and
  in a case where the success response is not received from the device identified by the third device ID, transmitting, through the firewall to the first mediation apparatus, first error information including the third device ID identifying the device from which the success response is not received,
  wherein the first control device is configured to further perform:
  receiving the first error information from the second mediation apparatus through the firewall; and
  in a case where the receiving receives the first error information, transmitting second error information as the first response to the management server via the internet, the second error information includes the second device ID matching the third device ID and information indicating that the device identified by the second device ID does not execute an instruction based on the first command.

29. The communication system according to claim 19, wherein the second control device is configured to further perform:

receiving from the device identified by the third device ID a success response indicating that the second command is executed in success;

in a case where the success response is not received from the device identified by the third device ID, transmitting, through the firewall to the first mediation apparatus, first error information which includes the third device ID identifying the device from which the success response is not received; and in a case where the status information is not received from the device, transmitting, through the firewall to the first mediation apparatus, second error information including device ID identifying the device and indicating that the status information is not received from the device, wherein the first control device is configured to further perform:

receiving the first error information from the second mediation apparatus through the firewall; and in a case where the receiving the first error information receives the first error information, transmitting third error information including the second device ID matching the third device ID and information indicating that the device identified by the second device ID does not execute an instruction based on the first instruction information, wherein the first control device does not perform transmitting the second error information to the management server.

30. The communication system according to claim 16, wherein the second control device is configured to further perform:

broadcasting, to devices in the local network, a broadcast request for requesting a response including a device ID identifying a device which receives the broadcast request;

receiving the response to the broadcast request from a device in the local network, the response including a device ID identifying the device transmitting the response; and transmitting, to the first mediation apparatus through the firewall, the mediation ID and the device ID which is included in the received response, wherein the first control device is configured to further perform:

receiving, from the second mediation apparatus through the firewall, the mediation ID and the device ID;

registering in the correlation database a record including the received mediation ID and the received device ID to be correlated with waiting-state information indicating that management of a device identified by the received device ID is not started;

receiving a start instruction for instructing to replace the waiting-state information in the record correlated to the received device ID into managing-state information indicating that the device identified by the received device ID is under management; and replacing the waiting-state information in the record correlated to the received device ID into the managing-state information according to the received start instruction, wherein the requesting to register the first device ID is performed after the start instruction is received.

* * * * *